United States Patent
Ueno et al.

(10) Patent No.: US 11,632,513 B2
(45) Date of Patent: *Apr. 18, 2023

(54) SOLID-STATE IMAGE SENSOR AND IMAGING DEVICE

(71) Applicant: Sony Semiconductor Solutions Corporation, Kanagawa (JP)

(72) Inventors: Yosuke Ueno, Kanagawa (JP); Golan Zeituni, Kfar-Saba (IL); Noam Eshel, Pardesia (IL); Yusuke Ikeda, Tokyo (JP); Kiyoshi Makigawa, Kanagawa (JP)

(73) Assignee: Sony Semiconductor Solutions Corporation, Kanagawa (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/507,174

(22) Filed: Oct. 21, 2021

(65) Prior Publication Data
US 2022/0046199 A1    Feb. 10, 2022

Related U.S. Application Data

(63) Continuation of application No. 16/634,341, filed as application No. PCT/JP2018/025970 on Jul. 10, 2018, now Pat. No. 11,178,350.

(30) Foreign Application Priority Data

Aug. 2, 2017 (JP) .............................. JP2017-149559
Jul. 9, 2018 (JP) .............................. JP2018-129588

(51) Int. Cl.
    *H04N 5/378*      (2011.01)
    *H04N 5/3745*     (2011.01)

(52) U.S. Cl.
    CPC ......... *H04N 5/378* (2013.01); *H04N 5/37457* (2013.01)

(58) Field of Classification Search
CPC .. H04N 5/378; H04N 5/37457; H04N 5/3651; H04N 5/379
See application file for complete search history.

(56) References Cited

U.S. PATENT DOCUMENTS

| 7,847,846 | B1 | 12/2010 | Ignjatovic |
| 11,178,350 | B2 * | 11/2021 | Ueno ..................... H04N 5/379 |

(Continued)

FOREIGN PATENT DOCUMENTS

| CN | 102789261 A | 11/2012 |
| CN | 103327268 A | 9/2013 |

(Continued)

OTHER PUBLICATIONS

Extended European Search Report dated Jun. 4, 2020 for corresponding European Application No. 18840367.9.

*Primary Examiner* — Nhan T Tran
(74) *Attorney, Agent, or Firm* — Michael Best & Friedrich LLP

(57) ABSTRACT

It makes it easier to reduce the line capacitance of vertical signal lines in a solid-state image sensor in which signals are output via the vertical signal lines.

The solid-state image sensor is provided with a logic circuit, a pixel circuit, and a negative capacitance circuit. In the solid-state image sensor, the logic circuit processes an analog signal. Also, in the solid-state image sensor, the pixel circuit generates an analog signal by photoelectric conversion, and outputs the analog signal to the logic circuit via a predetermined signal line. In the solid-state image sensor, the negative capacitance circuit is connected to the predetermined signal line.

15 Claims, 35 Drawing Sheets

(56) References Cited

U.S. PATENT DOCUMENTS

| | | |
|---|---|---|
| 2011/0199106 A1 | 8/2011 | Lotto |
| 2011/0267522 A1* | 11/2011 | Gendai .................. H04N 5/378 |
| | | 348/308 |
| 2012/0176523 A1 | 7/2012 | Yoo et al. |
| 2014/0085523 A1* | 3/2014 | Hynecek ........... H01L 27/14612 |
| | | 257/292 |
| 2014/0313385 A1* | 10/2014 | Sato ....................... H04N 5/378 |
| | | 348/302 |
| 2015/0208008 A1 | 7/2015 | Gendai |
| 2016/0006966 A1* | 1/2016 | Murakami ........... H04N 5/3745 |
| | | 348/308 |
| 2016/0225807 A1 | 8/2016 | Koitman et al. |

FOREIGN PATENT DOCUMENTS

| | | |
|---|---|---|
| CN | 103809653 A | 5/2014 |
| CN | 104469198 A | 3/2015 |
| JP | 2011-234243 A | 11/2011 |

\* cited by examiner a b c

SOLID-STATE IMAGE SENSOR AND IMAGING DEVICE

CROSS REFERENCES TO RELATED APPLICATIONS

The present Application is a Continuation Application of U.S. patent application Ser. No. 16/634,341 filed Jan. 27, 2020, which is a 371 National Stage Entry of International Application No.: PCT/JP2018/025970, filed on Jul. 10, 2018, which in turn claims priority from Japanese Application No. 2017-149559, filed on Aug. 2, 2017 and Japanese Application No. 2018-129588, filed on Jul. 9, 2018, the entire contents of which are incorporated herein by reference.

TECHNICAL FIELD

The present technology relates to a solid-state image sensor and an imaging device. More specifically, the present technology relates to a solid-state image sensor and imaging device in which vertical signal lines are disposed.

BACKGROUND ART

In the past, solid-state image sensors have been used to acquire image data in apparatus such as an imaging device. Typically, in a solid-state image sensor, a plurality of pixel circuits is arrayed in a two-dimensional matrix, and a vertical signal line is also disposed for every column. Additionally, the pixel circuits output signals via these vertical signal lines. At this point, if a parasitic capacitance occurs on one of the vertical signal lines, the parasitic capacitance causes a lengthening of the settling time until the potential on the vertical signal line becomes constant. Accordingly, to reduce the influence of parasitic capacitance, a solid-state image sensor has been proposed in which a current mirror circuit that supplies a current proportional to the degree of potential drop on a vertical signal line is connected to the vertical signal line (see Patent Document 1, for example).

CITATION LIST

Patent Document

Patent Document 1: Japanese Patent Application Laid-Open No. 2011-234243

SUMMARY OF THE INVENTION

Problems to be Solved by the Invention

In the technology of the related art described above, by supplying a current proportional to the degree of potential drop on a vertical signal line, the settling time until the potential becomes constant can be shortened, and the readout speed can be improved. However, there is a risk that connecting the current mirror circuit will lead to increased noise and reduced signal quality. If the line capacitance of a vertical signal line containing a parasitic capacitance is reduced, it is possible to eliminate the need for a current mirror circuit and moderate the reduction in signal quality, but reducing the line capacitance requires improvements in the materials and manufacturing processes of the vertical signal lines.

The present technology has been devised in light of such circumstances, and an object thereof is to make it easier to reduce the line capacitance of vertical signal lines in a solid-state image sensor in which signals are output via the vertical signal lines.

Solutions to Problems

The present technology has been made in view of the above-mentioned issues, and according to the first aspect of the present technology, there is provided a solid-state image sensor including: a logic circuit configured to process an analog signal; a pixel circuit configured to generate the analog signal by photoelectric conversion and output the analog signal to the logic circuit via a predetermined signal line; and a negative capacitance circuit connected to the predetermined signal line. With this arrangement, an effect of reducing the line capacitance of a predetermined signal line is achieved.

Further, in the first aspect of the present technology, the negative capacitance circuit may include an amplifier having an input terminal connected to the predetermined signal line, and a capacitor having two terminals each connected to the input terminal and an output terminal of the amplifier. With this arrangement, an effect of reducing the line capacitance of signal lines according to a gain greater than "1" is achieved.

Further, in the first aspect of the present technology, a current source connected to the predetermined signal line is further included, and the negative capacitance circuit may include an inserted transistor that is inserted between the current source and the predetermined signal line, an amplifier including a pair of transistors connected in a cascode configuration between a power source and a reference terminal, and a capacitor having one terminal connected to a junction of the pair of transistors and another terminal connected to a junction of the current source and the inserted transistor, and a gate of the transistor connected to the power source from among the pair of transistors may be connected to the predetermined signal line. With this arrangement, an effect of reducing the line capacitance of signal lines with a gain of "1" or less is achieved.

Further, in the first aspect of the present technology, a first bias voltage may be applied to a gate of the inserted transistor, and the current source may include a second transistor to which a second bias voltage different from the first bias voltage is applied. With this arrangement, an effect of reducing the line capacitance with a negative capacitance circuit in which different bias voltages are applied to first and second transistors is achieved.

Further, in the first aspect of the present technology, a first bias voltage may be applied to a gate of the inserted transistor, the current source may include a second transistor, and a gate of the inserted transistor may be connected to a gate of the second transistor. With this arrangement, an effect of reducing the line capacitance with a negative capacitance circuit in which the same bias voltages are applied to first and second transistors is achieved.

Further, in the first aspect of the present technology, a current source connected to the predetermined signal line may further be included, and the negative capacitance circuit may include an inserted transistor that is inserted between the current source and the predetermined signal line, an amplifier having an input terminal connected to the predetermined signal line, and a capacitor having one terminal connected to the input terminal of the amplifier and another terminal connected to a junction of the current source and the inserted transistor. With this arrangement, an effect of reducing the line capacitance of signal lines with a negative capacitance circuit having an increased negative capacitance value is achieved.

Further, in the first aspect of the present technology, a current source connected to the predetermined signal line may further be included, and the logic circuit may include a comparator configured to compare the analog signal to a predetermined reference signal and output a comparison result, and a control circuit configured to generate a control signal on the basis of the comparison result and output the generated control signal to the negative capacitance circuit. With this arrangement, an effect of generating a control signal from an analog signal is achieved.

Further, in the first aspect of the present technology, the negative capacitance circuit may include an inserted transistor that is inserted between the current source and the predetermined signal line, a capacitor, an amplifier having an input terminal connected to the predetermined signal line, a first switch configured to open and close a path between one terminal of the capacitor and an output terminal of the amplifier, and a second switch configured to connect another terminal of the capacitor to a junction of the inserted transistor and the current source or to a predetermined reference terminal, according to the control signal. With this arrangement, an effect of reducing the line capacitance of signal lines with a negative capacitance circuit that shares a capacitor with a successive approximation circuit is achieved.

Further, in the first aspect of the present technology, the comparator may include a divider circuit configured to divide a voltage between the analog signal and the predetermined reference signal, and output the divided voltage as an input voltage, and a differential amplifier circuit configured to amplify a difference between the input voltage and a predetermined voltage. With this arrangement, an effect of lowering the operating voltage of a comparator is achieved.

Further, in the first aspect of the present technology, the negative capacitance circuit may include an inserted transistor that is inserted between the current source and the predetermined signal line, a capacitor, an amplifier having an input terminal connected to the predetermined signal line, and a first switch configured to open and close a path between a junction of the inserted transistor and the current source, and one terminal of the capacitor, and a second switch configured to connect another terminal of the capacitor to an output terminal of the amplifier or a predetermined reference terminal, according to the control signal. With this arrangement, an effect of reducing the line capacitance of signal lines with a negative capacitance circuit that shares a capacitor with a successive approximation circuit is achieved.

Further, in the first aspect of the present technology, a current source connected to the predetermined signal line may further be included, and the negative capacitance circuit may include an inserted transistor that is inserted between the current source and the predetermined signal line, an amplifier having an input terminal connected to the predetermined signal line, and a switched capacitor circuit, and the switched capacitor circuit includes a capacitor, a first input-side switch configured to open and close a path between an output terminal of the amplifier and one terminal of the capacitor, a second input-side switch configured to open and close a path between a junction of the inserted transistor and the current source, and another terminal of the capacitor, a first output-side switch configured to open and close a path between the terminal and the logic circuit, and a second output-side switch configured to open and close a path between the another terminal and a predetermined reference terminal. With this arrangement, an effect of reducing the line capacitance of signal lines with a negative capacitance circuit that shares a capacitor with a sample-and-hold circuit is achieved.

Further, in the first aspect of the present technology, the pixel circuit may be disposed on a first semiconductor chip, and the negative capacitance circuit and the logic circuit may be disposed on a second semiconductor chip laminated on the first semiconductor chip. With this arrangement, an effect of reducing the line capacitance of signal lines in a laminated solid-state image sensor is achieved.

Further, in the first aspect of the present technology, a first current source connected to the predetermined signal line may further be included, and the negative capacitance circuit may include an inserted transistor that is inserted between the first current source and the predetermined signal line, a second current source, an n-type transistor that is inserted between the second current source and a power source and has a gate connected to the predetermined signal line, a clamp transistor connected in parallel with the n-type transistor between the power source and the second current source, and a capacitor having two terminals each connected to a junction of the inserted transistor and the first current source, and a junction of the n-type transistor and the second current source. With this arrangement, an effect of clamping the drain voltage of a second current source is achieved.

Further, in the first aspect of the present technology, a gate voltage supply unit configured to change a gate voltage of the clamp transistor may further be included. With this arrangement, an effect of regulating the amount of streaking is achieved.

Further, according to the second aspect of the present technology, there is provided an imaging device including: a logic circuit configured to process an analog signal and output a digital signal; a pixel circuit configured to generate the analog signal by photoelectric conversion and output the analog signal to the logic circuit via a predetermined signal line; a negative capacitance circuit connected to the predetermined signal line; and a recording unit configured to record the digital signal. With this arrangement, an effect of recording analog signals output from signal lines with reduced line capacitance is achieved.

Effects of the Invention

According to the present technology, in a solid-state image sensor in which signals are output via vertical signal lines, an excellent effect of making it easier to reduce the line capacitance of the vertical signal lines may be exhibited. Note that the effects described herein are not necessarily limited, and any effect described in the present disclosure may be included.

MODE FOR CARRYING OUT THE INVENTION

Hereinafter, forms for implementing the present technology (hereinafter, referred to as embodiments) will be described. The description will be made in the following order.

1. First embodiment (example of connecting negative capacitance circuit to vertical signal line)
2. Second embodiment (example of connecting negative capacitance circuit provided with an amplifier having small gain to vertical signal line)
3. Third embodiment (example of connecting negative capacitance circuit containing one side of a two-way split transistor to vertical signal line)
4. Fourth embodiment (example of connecting negative capacitance circuit containing one side of a two-way split transistor and amplifier having large gain to vertical signal line)
5. Fifth embodiment (example of connecting negative capacitance circuit sharing ADC and capacitor to vertical signal line)
6. Sixth embodiment (example of connecting negative capacitance circuit sharing sample-and-hold circuit and capacitor to vertical signal line)
7. Seventh embodiment (example of connecting negative capacitance circuit to vertical signal line in laminated solid-state image sensor)
8. Eighth embodiment (example of connecting negative capacitance circuit with added clamp transistor to vertical signal line)

9. Ninth embodiment (example of connecting negative capacitance circuit with added clamp transistor to vertical signal line, and controlling gate voltage of clamp transistor)

10. Tenth embodiment (example of connecting negative capacitance circuit to vertical signal line, and using low-voltage comparator)

11. Applications to moving body

1. First Embodiment

Exemplary Configuration of Imaging Device

Figure 1:
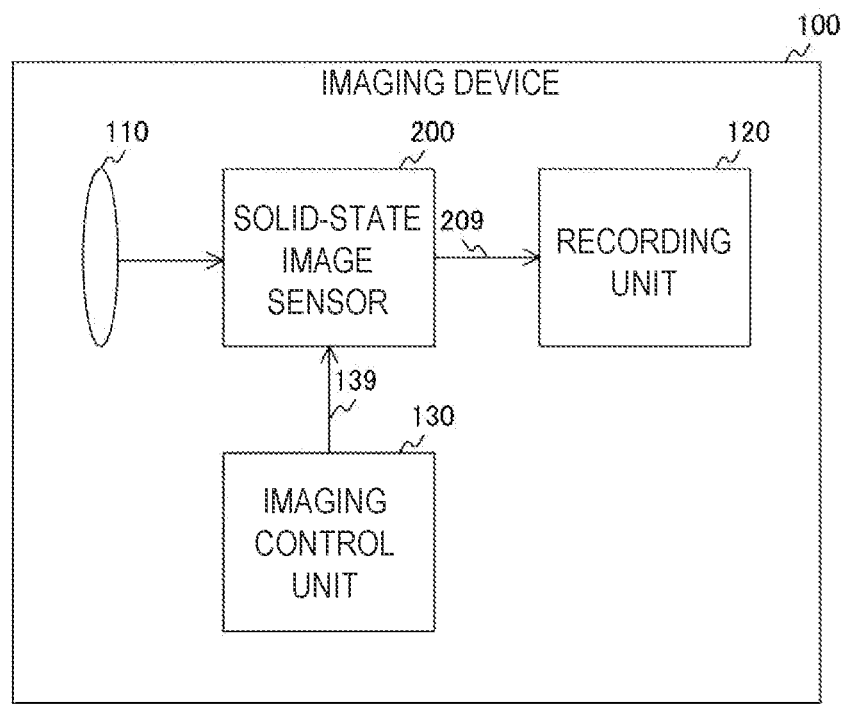
FIG. 1 is a block diagram illustrating one exemplary configuration of an imaging device according to a first embodiment of the present technology.

FIG. 1 is a block diagram illustrating one exemplary configuration of an imaging device 100 according to a first embodiment of the present technology. The imaging device 100 is a device that acquires image data, and is provided with an imaging lens 110, a solid-state image sensor 200, a recording unit 120, and an imaging control unit 130. The imaging device 100 may be a digital camera such as a digital still camera, for example, but is also anticipated to be a device such as a smartphone or computer equipped with imaging functions, or a vehicle-mounted camera.

The imaging lens 110 condenses and guides incident light to the solid-state image sensor 200. The solid-state image sensor 200 acquires image data under control by the imaging control unit 130. The solid-state image sensor 200 supplies acquired image data to the recording unit 120 via a signal line 209.

The imaging control unit 130 controls the solid-state image sensor 200. For example, the imaging control unit 130 generates a vertical synchronization signal at a fixed frequency (such as 30 Hertz) that indicates the imaging timings, and supplies the generated vertical synchronization signal to the solid-state image sensor 200 via a signal line 139. The recording unit 120 records image data.

Exemplary Configuration of Solid-State Image Sensor

Figure 2:
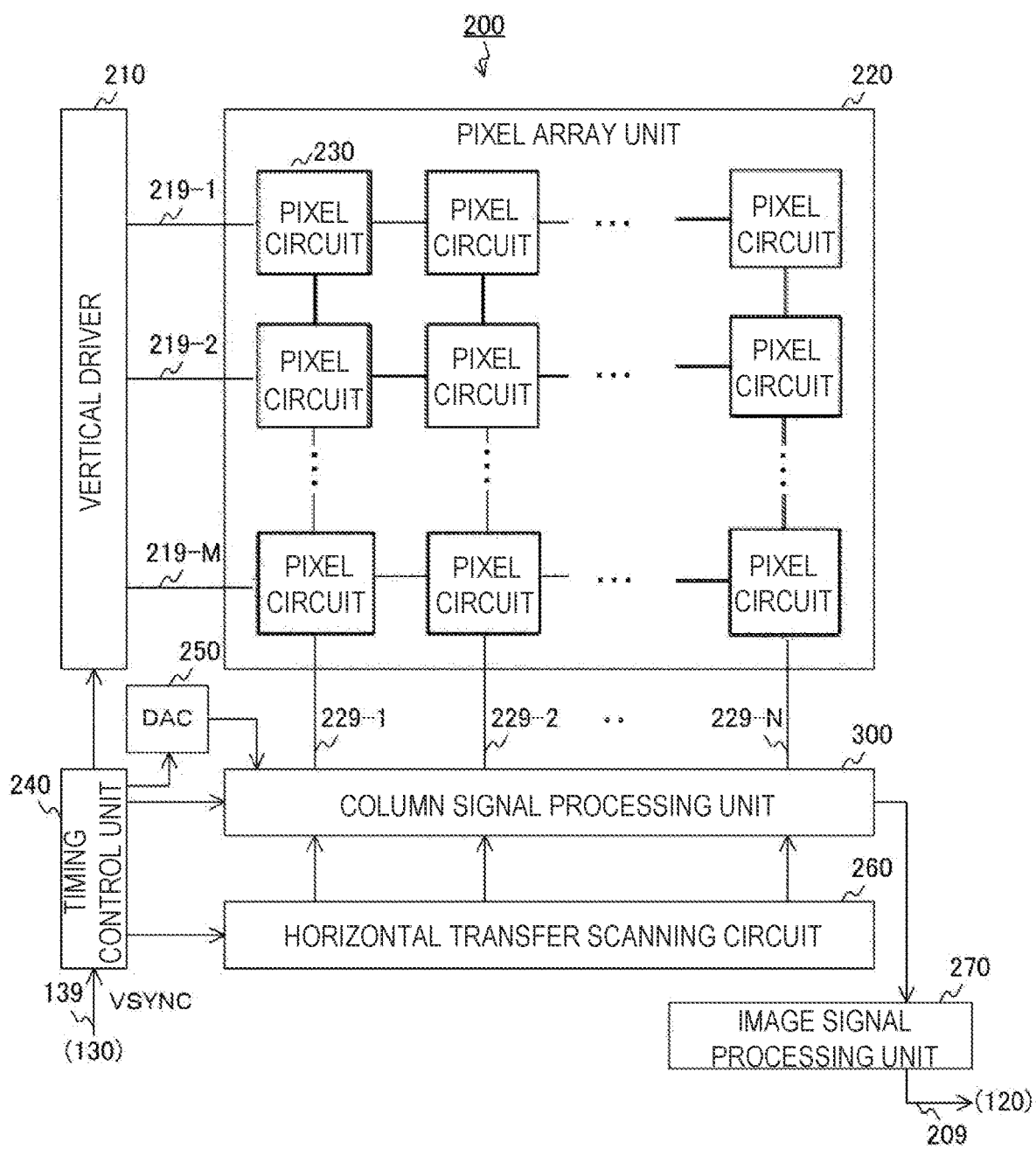
FIG. 2 is a block diagram illustrating one exemplary configuration of a solid-state image sensor according to the first embodiment of the present technology.

FIG. 2 is a block diagram illustrating one exemplary configuration of a solid-state image sensor 200 according to the first embodiment of the present technology. The solid-state image sensor 200 is provided with a vertical driver 210, a pixel array unit 220, a timing control unit 240, and a digital-to-analog converter (DAC) 250. Further, the solid-state image sensor 200 is also provided with a column signal processing unit 300, a horizontal transfer scanning circuit 260, and an image signal processing unit 270. These circuits are assumed to be mounted on a single semiconductor chip.

In the pixel array unit 220, a plurality of pixel circuits 230 is arrayed in a two-dimensional matrix. Hereinafter, a set of the pixel circuits 230 arrayed in a predetermined direction (such as the horizontal direction) in the pixel array unit 220 will be referred to as a "row", while a set of the pixel circuits 230 arrayed in a direction perpendicular to the rows will be referred to as a "column". Also, the number of rows in the pixel array unit 220 is denoted by M (where M is an integer), while the number of columns is denoted by N (where N is an integer). Furthermore, for every column of the pixel array unit 220, a 229-n (where n is an integer from 1 to N) is disposed in the column direction.

The vertical driver 210 sequentially selects and drives the rows. The control method for sequentially driving the rows in this way is called the rolling shutter method. Note that instead of the rolling shutter method, the vertical driver 210 may also use a global shutter method that drives all rows simultaneously.

The timing control unit 240 controls the operating timings of the vertical driver 210, the DAC 250, the column signal processing unit 300, and the horizontal transfer scanning circuit 260, in synchronization with a vertical synchronization signal VSYNC.

The DAC 250 generates a predetermined reference signal by digital-to-analog (DA) conversion, and supplies the generated reference signal to the column signal processing unit 300. A ramp signal with a sawtooth waveform is used as the reference signal, for example.

Each pixel circuit 230 generates an analog pixel signal by photoelectric conversion. The n columns of pixel circuits 230 output pixel signals to the column signal processing unit 300 via the vertical signal lines 229-n.

The column signal processing unit 300 executes signal processing such as an analog-to-digital (AD) conversion process on the pixel signals by column. The column signal processing unit 300 supplies the signal-processed data to the image signal processing unit 270 sequentially as pixel data, under control by the horizontal transfer scanning circuit 260. From M×N pieces of pixel data, the data of a single image is generated.

The horizontal transfer scanning circuit 260 controls and causes the column signal processing unit 300 to output pixel data sequentially.

The image signal processing unit 270 executes predetermined image processing, such as a white balance process and a pixel addition process, on the image data. The image signal processing unit 270 outputs the processed image data to the recording unit 120.

Note that although the image signal processing unit 270 is disposed internally in the solid-state image sensor 200, all or part of the image signal processing unit 270 may also be disposed externally to the solid-state image sensor 200.

Exemplary Configuration of Pixel Circuit

Figure 3:
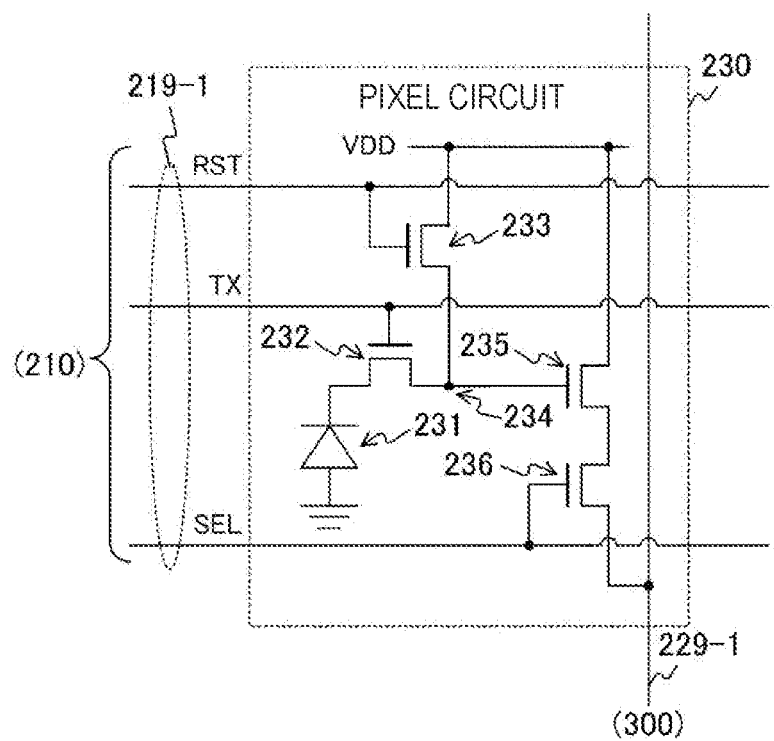
FIG. 3 is a circuit diagram illustrating one exemplary configuration of a pixel circuit according to the first embodiment of the present technology.

FIG. 3 is a circuit diagram illustrating one exemplary configuration of a pixel circuit 230 according to the first embodiment of the present technology. Each pixel circuit 230 is provided with a photodiode 231, a transfer transistor 232, a reset transistor 233, a floating diffusion 234, an amplifying transistor 235, and a select transistor 236.

The photodiode 231 photoelectrically converts incident light to generate charge. The transfer transistor 232, obeying a transfer signal TX from the vertical driver 210, transfers charge from the photodiode 231 to the floating diffusion 234.

The reset transistor 233, obeying a reset signal RST from the vertical driver 210, draws out charge from the floating diffusion 234 to initialize the amount of charge.

The floating diffusion 234 stores charge transferred from the photodiode 231, and generates a voltage corresponding to the stored amount of charge.

The amplifying transistor 235 amplifies a signal of the voltage of the floating diffusion 234. The select transistor 236, obeying a select signal SEL from the vertical driver 210, outputs the signal amplified by the amplifying transistor 235 as a pixel signal to the column signal processing unit 300 via one of the vertical signal lines 229-n.

Note that insofar as it is possible to generate a pixel signal by photoelectric conversion, the configuration of the pixel circuit 230 is not limited to the example illustrated in FIG. 3. For example, the configuration may also have a shared structure in which a plurality of pixels shares the floating diffusion 234.

[Exemplary Configuration of Column Signal Processing Unit]

Figure 4:
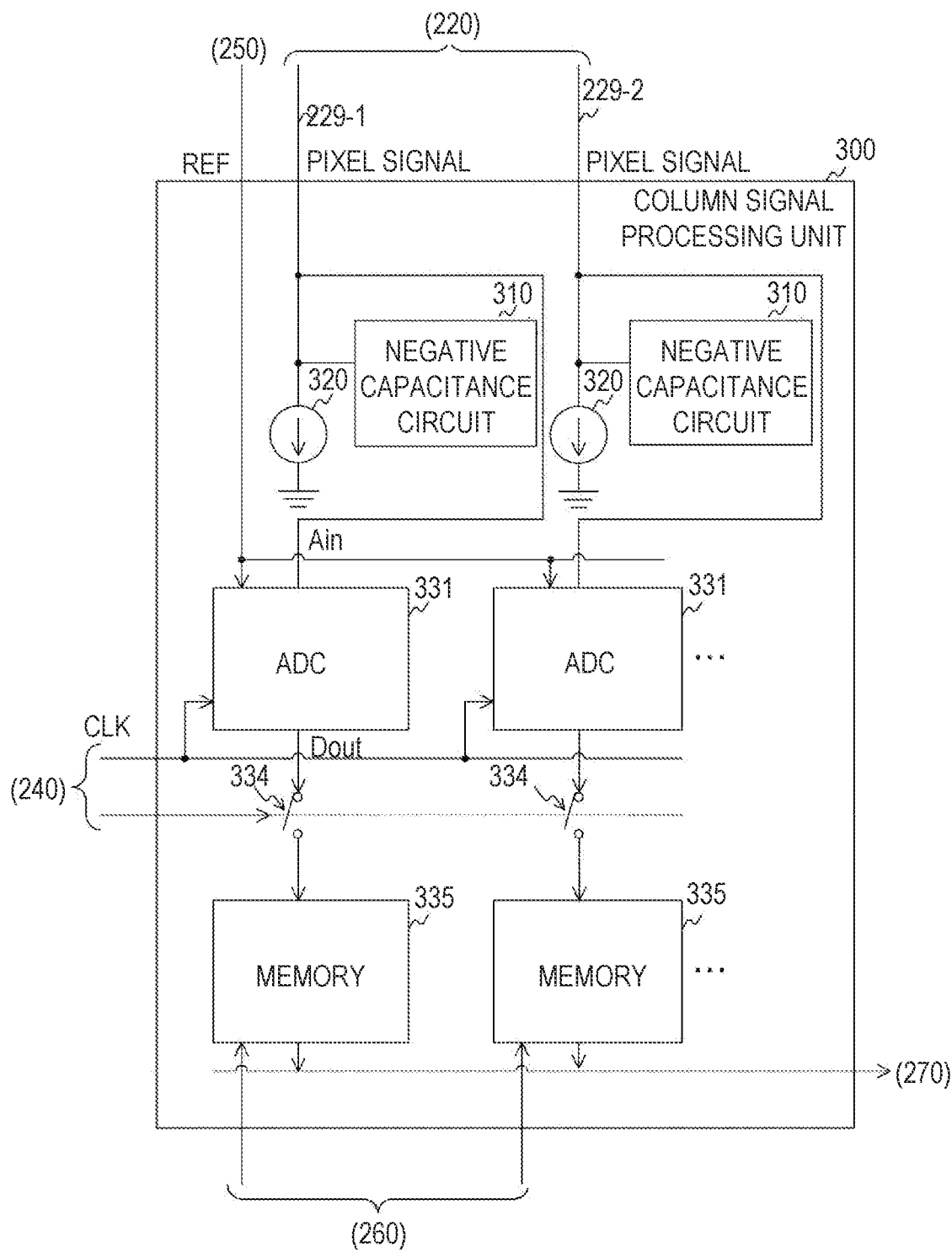
FIG. 4 is a block diagram illustrating one exemplary configuration of a column signal processing unit according to the first embodiment of the present technology.

FIG. 4 is a block diagram illustrating one exemplary configuration of a column signal processing unit 300 according to the first embodiment of the present technology. For every column, the column signal processing unit 300 is provided with a negative capacitance circuit 310, a current source 320, an ADC 331, a switch 334, and memory 335. Because there are N columns, N each of the negative capacitance circuit 310, the current source 320, the ADC 331, the switch 334, and the memory 335 are disposed.

The current source 320 supplies a constant current. The current source 320 is inserted between the vertical signal line 229-n of the corresponding column and a terminal of a reference potential (such as ground potential).

The negative capacitance circuit 310 is a circuit that functions as a capacitor with a negative capacitance. Typically, if a parasitic capacitance occurs on one of the vertical signal lines and the line capacitance increases, the increase in the line capacitance causes a lengthening of the settling time until the potential on the vertical signal line becomes constant. Consequently, there is a risk of lowered readout speed. However, because the negative capacitance circuit 310 is connected to the vertical signal line 229-1, the line capacitance can be reduced and a lowering of the readout speed can be suppressed.

Although it is also possible to reduce the line capacitance by changing the material of the vertical signal line to a material with a lower dielectric constant or shrinking the process rule, process development is extremely expensive and time-consuming, which leads to difficulties. In contrast, because the method of connecting the negative capacitance circuit 310 does not require changes to the material of the vertical signal line or the like, the line capacitance can be reduced easily.

The ADC 331 performs AD conversion of an analog signal (pixel signal) Ain output via the vertical signal line 229-n of the corresponding column. The ADC 331 compares a reference signal REF from the DAC 250 to the analog signal Ain, and generates a digital signal Dout on the basis of the comparison result. The ADC 331 outputs the digital signal Dout to the switch 334. Note that the ADC 331 is one example of a logic circuit described in the claims.

The switch 334, under control by the timing control unit 240, outputs the digital signal Dout from the ADC 331 of the corresponding column as pixel data to the memory 335.

The memory 335 holds the pixel data of the corresponding column. The memory 335, under control by the horizontal transfer scanning circuit 260, outputs pixel data to the image signal processing unit 270.

Exemplary Configuration of ADC

Figure 5:
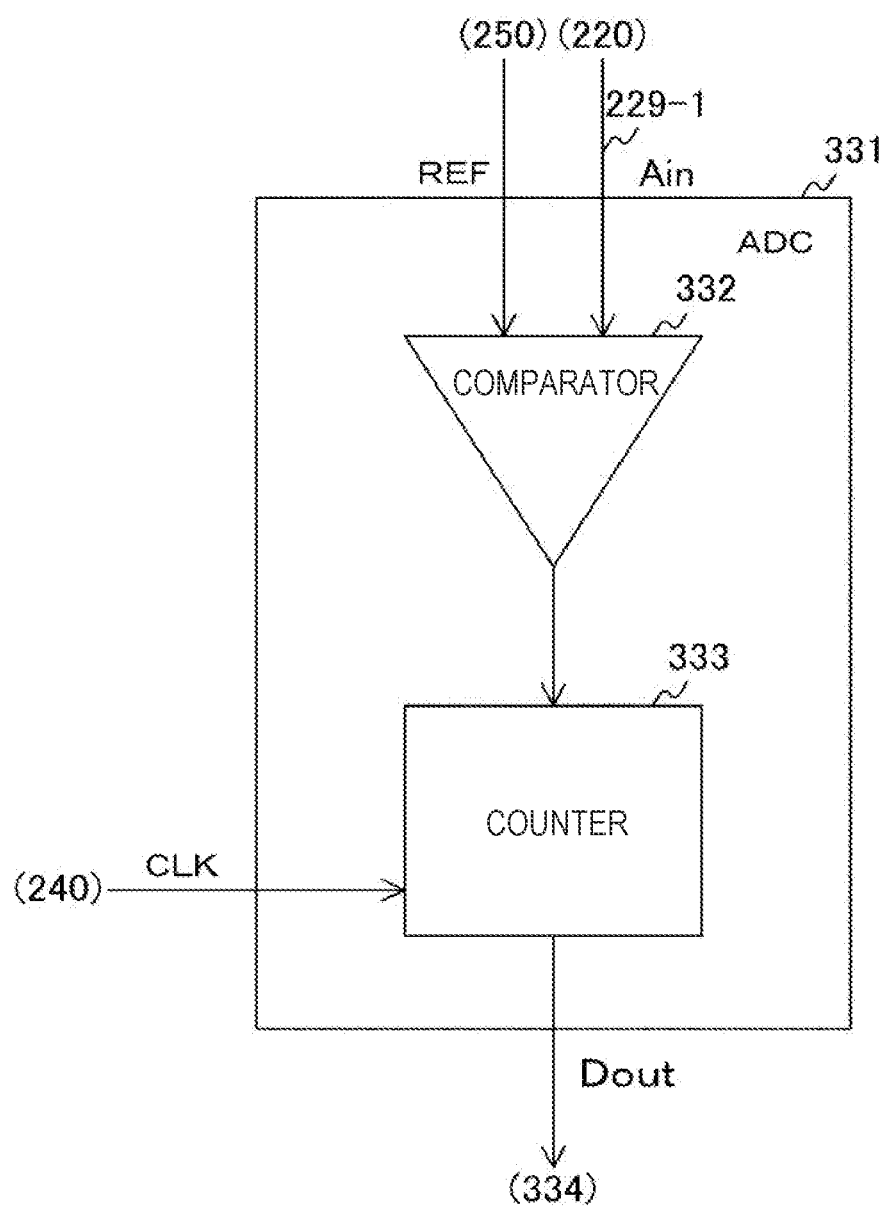
FIG. 5 is a block diagram illustrating one exemplary configuration of an analog-to-digital converter (ADC) according to the first embodiment of the present technology.

FIG. 5 is a block diagram illustrating one exemplary configuration of an ADC 331 according to the first embodiment of the present technology. The ADC 331 is provided with a comparator 332 and a counter 333.

The comparator 332 compares the analog signal Ain from the pixel circuits 230 inside the pixel array unit 220 to the reference signal REF from the DAC 250. The comparator 332 outputs a comparison result signal indicating the comparison result to the counter 333. A differential amplifier circuit that amplifies the difference between the analog signal Ain and the reference signal REF is used as the comparator 332, for example.

The counter 333 keeps a count value in synchronization with a clock signal CLK from the timing control unit 240 over a period during which the comparison result signal is at a predetermined level. The counter 333 outputs the digital signal Dout indicating the count value to the switch 334.

Note that the ADC 331 additionally may perform a correlated double sampling (CDS) process, which computes the difference between a reset level and a signal level. Herein, the reset level is the level of the analog signal Ain immediately after a reset, while the signal level is the level of the analog signal Ain immediately after transferring charge to the floating diffusion 234. In the case of performing the CDS process, for example, the counter 333 executes a down counter during the AD conversion of the reset level, and an up counter during the AD conversion of the signal level. With this arrangement, the net pixel data obtained from the difference between the reset level and the signal level is obtained.

Also, the AD conversion is performed by the sloped ADC 331 including the comparator 332 and the counter 333, but the ADC is not limited to a sloped ADC and may also be a type such as a successive approximation ADC described later.

Exemplary Configuration of Negative Capacitance Circuit

Figure 6:
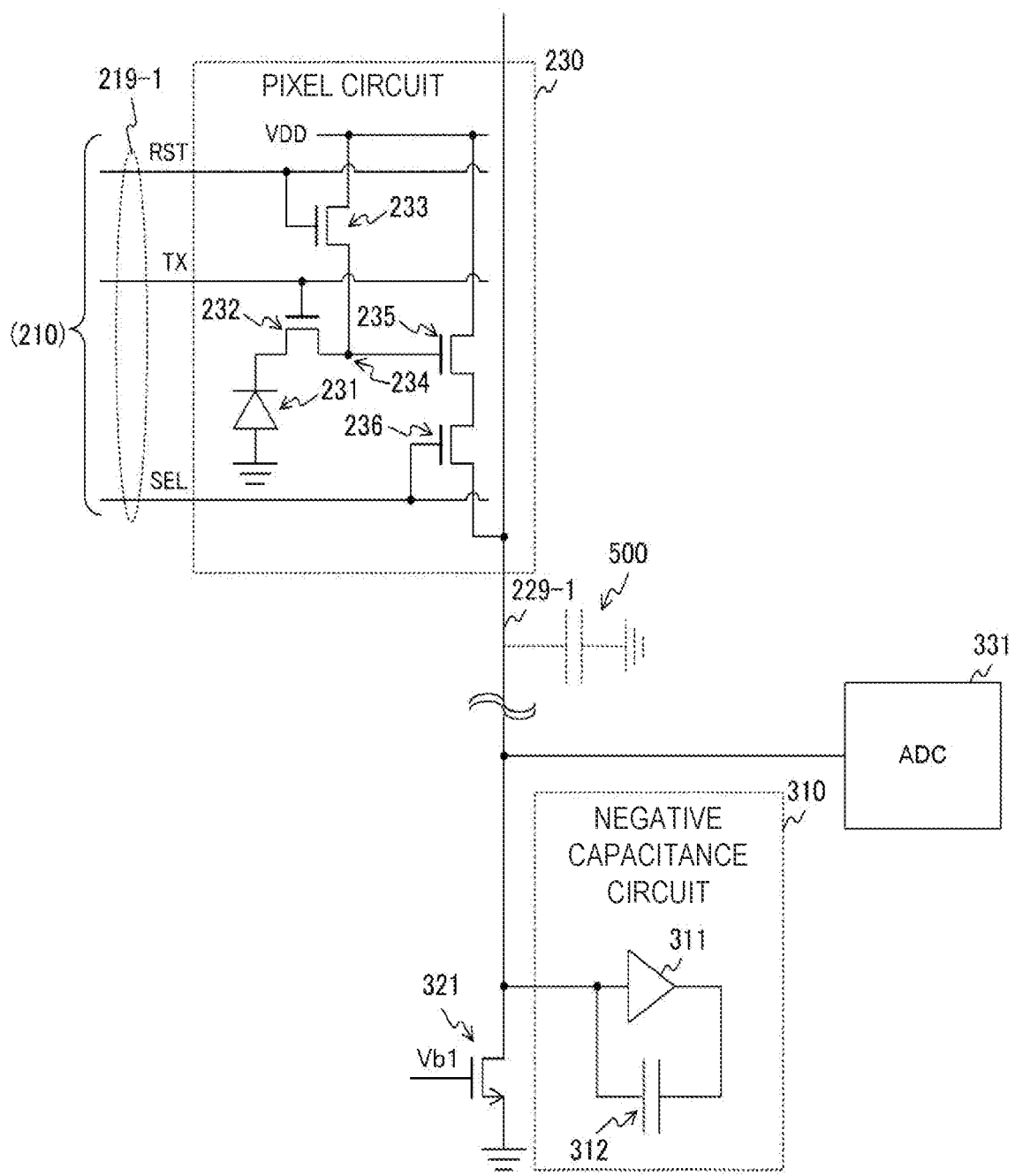
FIG. 6 is a circuit diagram illustrating one exemplary configuration of a negative capacitance circuit according to the first embodiment of the present technology.

FIG. 6 is a circuit diagram illustrating one exemplary configuration of a negative capacitance circuit 310 according to the first embodiment of the present technology. The negative capacitance circuit 310 is provided with an amplifier 311 and a capacitor 312. The input terminal of the amplifier 311 is connected to one of the vertical signal lines 229-n. The gain of the 311 is assumed to be greater than "1". Also, the two terminals of the capacitor 312 are each connected to the input terminal and the output terminal of the amplifier 311.

Also, the current source 320 is realized by an n-type transistor 321. A predetermined bias voltage Vb1 is applied to the gate of the n-type transistor 321. Also, the source of the n-type transistor 321 is connected to one of the vertical signal lines 229-n, while the drain is connected to a terminal of a predetermined reference potential (for example, ground potential). A metal-oxide-semiconductor (MOS) transistor is used as the n-type transistor 321, for example.

Also, a parasitic capacitance 500 is assumed to exist on each of the vertical signal lines 229-n. Provided that Vs is the potential on one of the vertical signal lines 229-n, and the potential (ground potential) on the opposite side of the vertical signal line 229-n is treated as a reference, a voltage of +Vs is applied to the parasitic capacitance 500.

Meanwhile, provided that the gain of the amplifier 311 is "2" in the negative capacitance circuit 310, Vs is applied to the terminal on the vertical signal line 229-n side of the capacitor 312, while 2Vs is applied on the terminal on the opposite side. For this reason, if the potential (2Vs) on the side opposite from the vertical signal line 229-n is treated as a reference, a voltage of −Vs is applied to the capacitor 312.

Because +Vs is applied to the parasitic capacitance 500 and −Vs is applied to the capacitor 312, the line capacitance of the vertical signal line 229-n is lowered compared to the case of not connecting the negative capacitance circuit 310. On the assumption that the parasitic capacitance 500 and the capacitor 312 have the same electrostatic capacitance, the total of the amounts of charge in each of the parasitic capacitance 500 and the capacitor 312 becomes "0" coulombs (C). For this reason, the total capacitance (that is, the line capacitance) combining the parasitic capacitance and the negative capacitance becomes "0" farads (F).

Note that the gain of the amplifier 311 is not limited to "2" and may also be a value other than "2" insofar as the value makes it possible to sufficiently reduce the influence of the parasitic capacitance 500. However, if the gain is set to "1" or less, the capacitance of the negative capacitance circuit 310 will not be negative, and therefore the gain is set to a value greater than "1".

In this way, in the first embodiment of the present technology, because the negative capacitance circuit 310 is connected to each of the vertical signal lines 229-$n$, the line capacitance of each of the vertical signal lines 229-$n$ can be reduced compared to the case of not connecting the negative capacitance circuit 310. With this arrangement, settling time until the potential of each vertical signal line 229-$n$ becomes constant can be shortened, and the readout speed can be increased. Also, because it is not necessary to change the material of the vertical signal line 229-1 or shrink the process rule, the line capacitance can be reduced easily.

2. Second Embodiment

In the first embodiment described above, the amplifier 311 having a gain greater than "1" is disposed inside the negative capacitance circuit 310, but the more the gain is increased, the circuit size increases, and in addition, inconsistencies in the gain among the columns increase. Furthermore, because large inconsistencies in the gain among the columns produce inconsistencies in the signal level among the columns even with respect to the same brightness, the quality of the image data is lowered. The negative capacitance circuit 310 according to the second embodiment differs from the first embodiment by improving the negative capacitance circuit 310 to suppress lowered quality of the image data.

Figure 7:
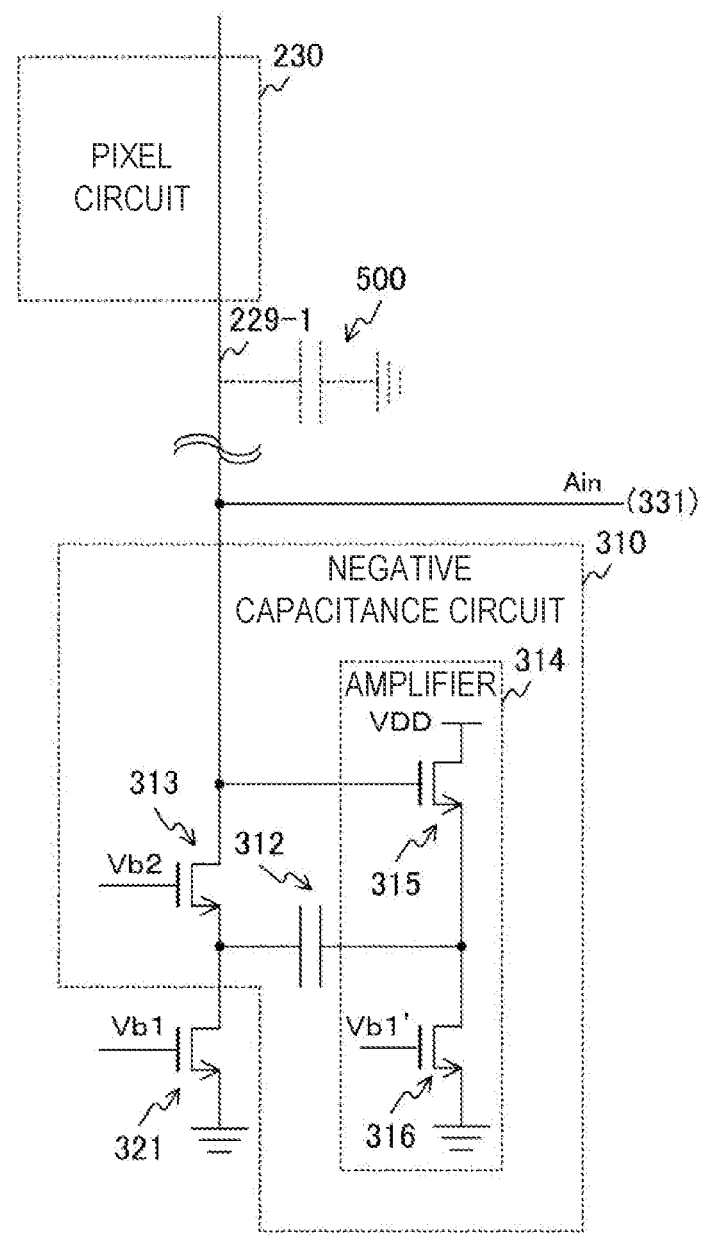
FIG. 7 is a circuit diagram illustrating one exemplary configuration of a negative capacitance circuit according to the second embodiment of the present technology.

FIG. 7 is a circuit diagram illustrating one exemplary configuration of a negative capacitance circuit 310 according to the second embodiment of the present technology. The negative capacitance circuit 310 according to the second embodiment differs from the first embodiment in that an n-type transistor 313 is additionally provided, and an amplifier 314 is provided instead of the amplifier 311.

The amplifier 314 is provided with n-type transistors 315 and 316 connected in a cascode configuration between a power source and a terminal of a reference potential (such as ground potential). The gate of the n-type transistor 315 is connected to one of the vertical signal lines 229-$n$, and a bias voltage Vb1' is applied to the gate of the n-type transistor 316. The value of the bias voltage Vb1' may be the same value as the bias voltage Vb1 or a different value. If the values are the same, the circuit that supplies the bias voltages can be reduced in size.

Also, the n-type transistor 313 is connected in a cascode configuration to the n-type transistor 321 that acts as the current source. In other words, the n-type transistor 313 is inserted between the vertical signal line 229-$n$ and the current source. A bias voltage Vb2 different from the bias voltage Vb1 is applied to the gate of the n-type transistor 313. MOS transistors are used as the n-type transistors 313, 315, and 316, for example. Note that the n-type transistor 313 is one example of an inserted transistor described in the claims.

Additionally, one terminal of the capacitor 312 is connected to a junction of the n-type transistors 313 and 321, while the other terminal of the capacitor 312 is connected to a junction of the n-type transistors 315 and 316.

Figure 8:
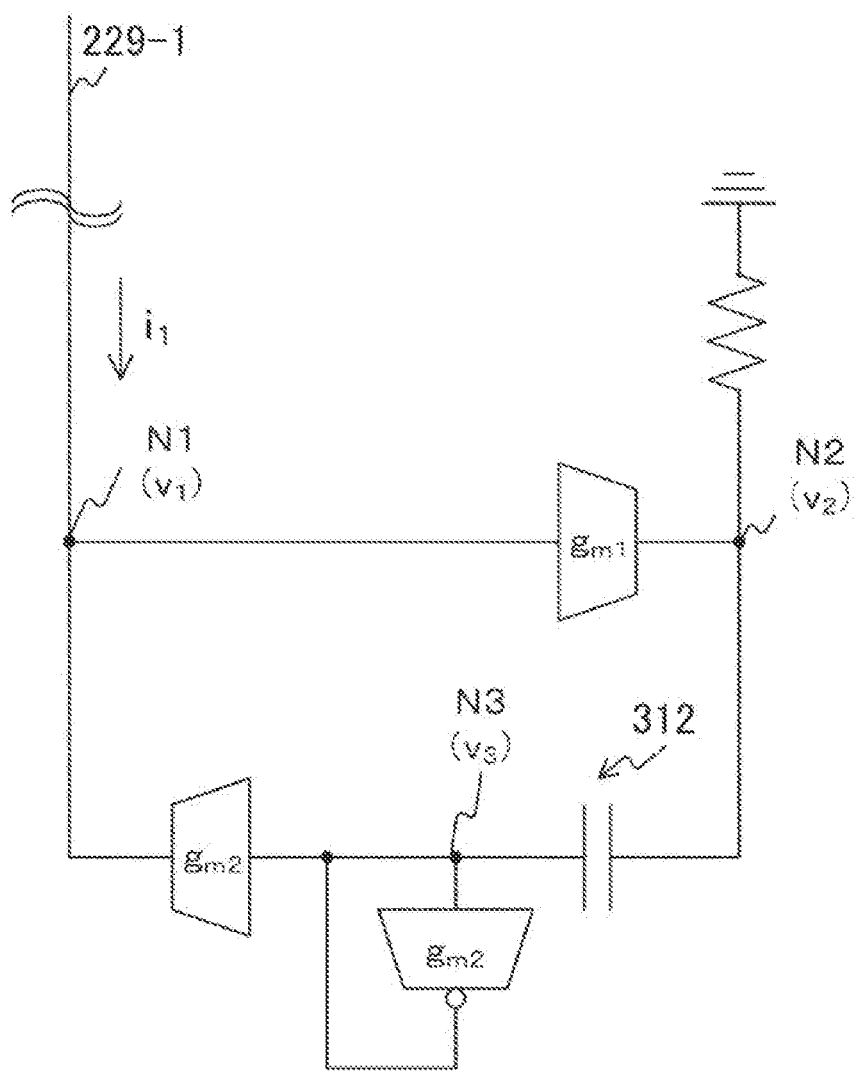
FIG. 8 is a circuit diagram illustrating one example of a linear model according to the second embodiment of the present technology.

FIG. 8 is a circuit diagram illustrating one exemplary configuration of a linear model according to the second embodiment of the present technology. The circuit in FIG. 7 can be expressed by the linear model in FIG. 8. In the linear model, the transconductance of the path between a node N1 on one of the vertical signal lines 229-$n$ and a node N2 is $g_{m1}$. Also, the transconductance of a path between the node N1 and a node N3 is $g_{m2}$. The transconductance of a loop circuit connected to the node N3 is $g_{m2}$. Also, the resistance of a path between the node N2 and the ground potential is R. A capacitor of capacitance C is inserted between the node N3 and the node N2. Also, the potential of the node N1 is denoted $v_1$, the potential of the node N2 is denoted $v_2$, and the potential of the node N3 is denoted $v_3$.

The following charge conservation formulas hold for each of the nodes.

$$g_{m1}v_1 = v_2/R + sC(v_2 - v_3) \qquad \text{Formula 1}$$

$$sC(v_2 - v_3) = g_{m2}v_3 \qquad \text{Formula 2}$$

$$i_1 = -g_{m2}v_3 \qquad \text{Formula 3}$$

In the above formulas, s represents a complex number, and $i_1$ represents the current flowing through the vertical signal line 229-$n$. The units of $i_1$ are amperes (A), for example, and the units of the transconductances $g_{m1}$ and $g_{m2}$ are siemens (G), for example. The units of the resistance R are ohms, for example, and the units of the potentials v1, v2, and v3 are volts (v), for example.

Formula 2 can be transformed into the following formula.

[Math. 1]

$$v_3 = \frac{s\dfrac{C}{g_{m2}}}{1 + s\dfrac{C}{g_{m2}}} \cdot v_2 \qquad \text{Formula 4}$$

According to Formula 4, the linear model has the property of a high-pass filter with a pole at the angular frequency $g_{m2}/C$. Next, the following formula is obtained from Formulas 1 and 3.

[Math. 2]

$$v_2 = g_{m1} R \cdot \frac{1 + s\dfrac{C}{g_{m2}}}{1 + s\dfrac{C}{g_{m2}}(1 + g_{m2}R)} v_1 \qquad \text{Formula 5}$$

According to Formula 5, the linear model has transmission characteristics of having a zero point at the angular frequency $g_{m2}/C$, and having a pole at the lower angular frequency $g_{m2}/\{C(1+g_{m2}R)\}$. Furthermore, if Formulas 4 and 5 are substituted into Formula 3, the following formula is obtained.

[Math. 3]

$$i_1 = -g_{m1}g_{m2}R \cdot \frac{s\dfrac{C}{g_{m2}}}{1 + s\left(\dfrac{C}{g_{m2}} + RC\right)} v_1 \qquad \text{Formula 6}$$

According to Formula 6, an impedance Z of the linear model as the load is expressed by the following formula.

[Math. 4]

$$Z = \frac{v_1}{i_1} = -\frac{1}{g_{m2}}\frac{1}{g_{m1}R} \cdot \frac{1 + s\frac{C}{g_{m2}}(1 + g_{m2}R)}{s\frac{C}{g_{m2}}} \quad \text{Formula 7}$$

In the above formula, the units of the impedance Z are ohms.

If a low-frequency approximation is performed on Formula 7, the following formula is obtained.

[Math. 5]

$$Z \cong -\frac{1}{g_{m1}R} \cdot \frac{1}{sC} \quad \text{when } |s| \ll \left(\frac{g_{m2}}{C(1 + g_{m2}R)}\right) \quad \text{Formula 8}$$

According to Formula 8, when the angular frequency is sufficiently lower than $g_{m2}/\{C(1+g_{m2}R)\}$, the linear model has a negative capacitance of $-g_{m1}R \cdot C$. In other words, the negative capacitance value is the value obtained by multiplying the capacitance of the capacitor 312 by the direct-current (DC) gain of the amplifier 314. Counterintuitively, the transconductance $g_{m2}$ is not manifested in the negative capacitance value. Also, according to Formula 7, in a high-frequency band, the impedance Z is expressed by the following formula.

[Math. 6]

$$Z \cong -\frac{1}{g_{m2}}\frac{1 + g_{m2}R}{g_{m1}R} \quad \text{when } |s| \gg \left(\frac{g_{m2}}{C(1 + g_{m2}R)}\right) \quad \text{Formula 9}$$

According to Formula 9, the linear model does not act as an ideal negative capacitance, and becomes a negative resistance in the high-frequency band. Although the behavior also depends on the parasitic capacitance of the vertical signal line 229-n, there is a risk that the linear model not acting as an ideal negative capacitance will destabilize the vertical signal line 229-n. For example, the behavior may cause ringing. Consequently, it is preferable to make the negative capacitance value $-g_{m1}R \cdot C$ as large as possible while also keeping the zero-point angular frequency $g_{m2}/\{C(1+g_{m2}R)\}$ as large as possible. In terms of design parameters, from the perspective of increasing the negative capacitance value, the transconductance $g_{m1}$ of the amplifier 314 is preferably large, and from the perspective of maintaining stability, the transconductance $g_{m2}$ of the n-type transistor 313 is preferably large. Additionally, the resistance R and the capacitance C are preferably large from the perspective of increasing the negative capacitance value, but preferably small from the perspective of maintaining stability. If the case of using a source follower for the amplifier 314 is considered, because the resistance R is $1/g_{m1}$, the following formula holds.

[Math. 7]

$$Z \cong -\frac{1}{g_{m2}} \cdot \frac{1 + s\frac{C}{g_{m2}}\left(1 + \frac{g_{m2}}{g_{m1}}\right)}{s\frac{C}{g_{m2}}} \rightarrow -\frac{1}{sC} \quad \text{Formula 10}$$

$$\text{when } |s| \ll \left(\frac{g_{m2}}{C(1 + g_{m2}/g_{m1})}\right)$$

According to Formula 10, the negative capacitance value becomes $-C$ and is determined by only the capacitance C of the capacitor 312. Meanwhile, the zero-point frequency is expressed by the following formula.

[Math. 8]

$$\frac{g_{m2}}{C(1 + g_{m2}/g_{m1})} = \frac{1}{C(1/g_{m1} + 1/g_{m2})} \quad \text{Formula 11}$$

According to Formula 11, the transconductances $g_{m1}$ and $g_{m2}$ are both found to be large. On the other hand, because the configuration causes the zero-point frequency to be determined by the smaller of the transconductances, and the transconductances are mostly determined by the bias current, care must be taken when computing the current draw.

Note that in the case of replacing the source follower with a super source follower, first, because the DC gain $g_{m1}R$ is substantially "1", the negative capacitance value is still $-C$, but the transconductance $g_{m1}$ increases by one step of the intrinsic gain. For this reason, the stability may be considered to be improved. A similar effect is also obtained by increasing the bias current of the source follower, but from the perspective of increasing the transconductance $g_{m1}$, the super source follower configuration is thought to have better current efficiency.

As described above, the capacitance of the negative capacitance circuit 310 is negative even if the gain of the amplifier 314 is "1" or less. For this reason, the circuit size of the negative capacitance circuit 310 can be reduced compared to the first embodiment in which the gain of the amplifier must be greater than "1". Also, inconsistencies in the gain among the columns can be suppressed, and the quality of the image data can be improved.

Figure 9:
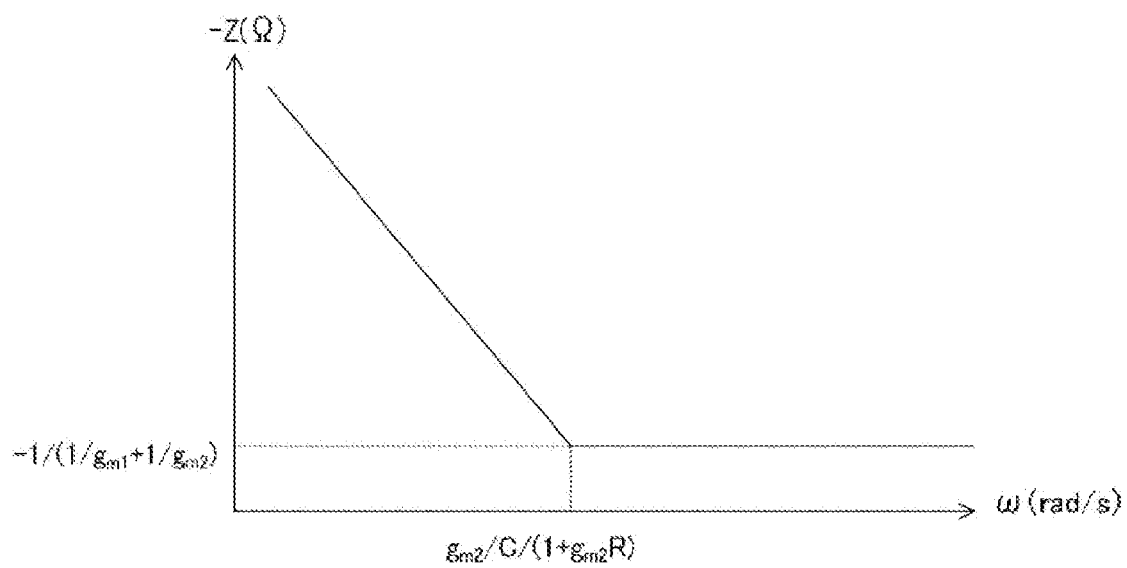
FIG. 9 is a graph illustrating one example of the impedance characteristics of the negative capacitance circuit according to the second embodiment of the present technology.

FIG. 9 is a graph illustrating one example of the impedance characteristics of the negative capacitance circuit 310 according to the second embodiment of the present technology. The vertical axis in the diagram is the impedance Z, while the horizontal axis is the angular frequency. According to the diagram, the capacitance becomes $-C$ in the frequency band lower than the zero-point frequency.

In this way, according to the second embodiment of the present technology, the n-type transistor 313 connected in a cascode configuration to the current source and the amplifier 314 including a pair of transistors connected in a cascode configuration are provided, the gain of the amplifier 314 can be lowered to "1" or less. With this arrangement, inconsistencies in the gain among the columns can be suppressed, and the quality of the image data can be improved.

3. Third Embodiment

In the second embodiment described above, the n-type transistor 313 is inserted between the n-type transistor 321 of the current source and the vertical signal line 229-n. Inserting the n-type transistor 313 leads to concerns regarding reduced dynamic range, increased total transistor area, and increased circuit size of the circuit that supplies the bias voltages. The negative capacitance circuit 310 according to the third embodiment differs from the second embodiment by removing the n-type transistor 313.

Figure 10:
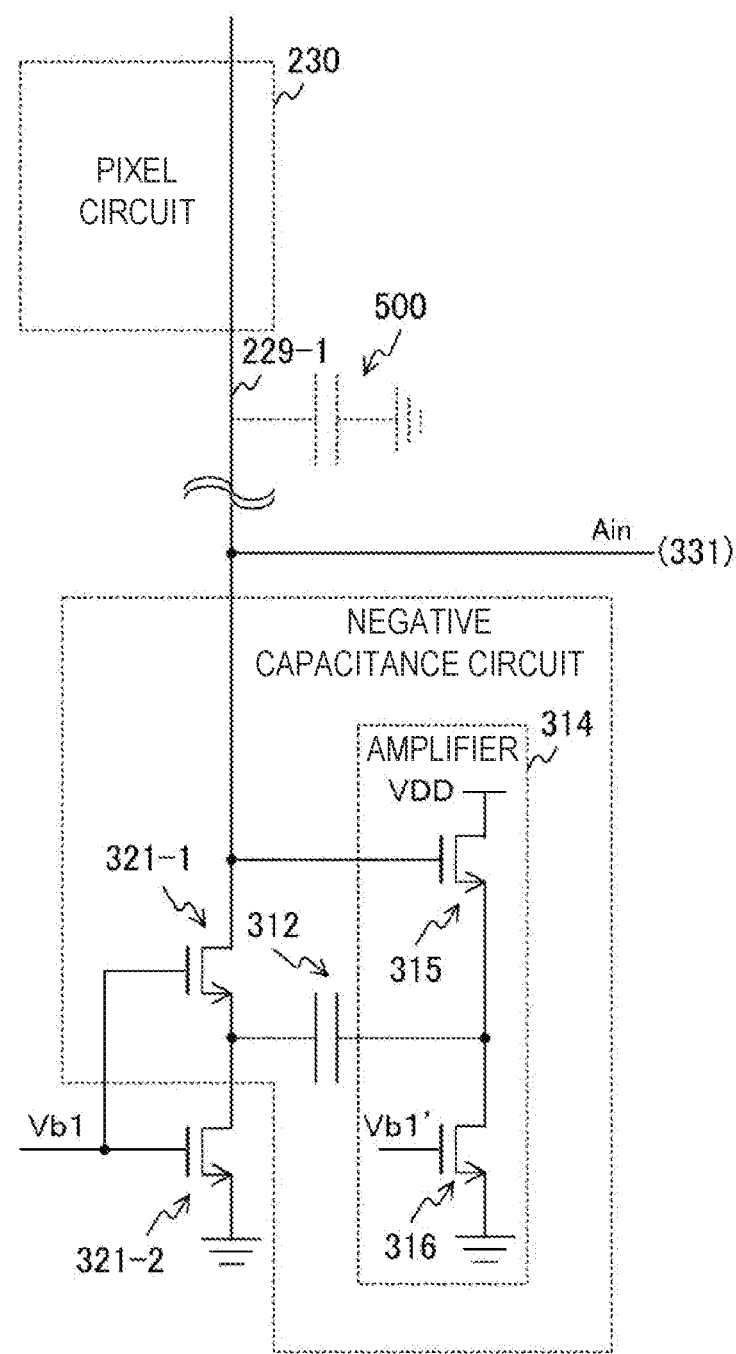
FIG. 10 is a circuit diagram illustrating one exemplary configuration of a negative capacitance circuit according to the third embodiment of the present technology.

FIG. 10 is a circuit diagram illustrating one exemplary configuration of a negative capacitance circuit 310 according to the third embodiment of the present technology. The negative capacitance circuit 310 according to the third embodiment differs from the second embodiment in that the n-type transistor 313 is not provided, and n-type transistors 321-1 and 321-2 are provided instead of the n-type transistor 321.

The n-type transistors 321-1 and 321-2 are connected in a cascode configuration between one of the vertical signal lines 229-n and a ground potential, and the bias voltage Vb1 is applied to the gates of both transistors. Also, the sum of the gate length of each of the n-type transistors 321-1 and 321-2 is equal to the gate length of the n-type transistor 321, and the gate width of each of the n-type transistors 321-1 and 321-2 is equal to the gate width of the n-type transistor 321. In other words, the n-type transistors 321-1 and 321-2 are equivalent to a two-way split of the n-type transistor 321.

Also, one terminal of the capacitor 312 is connected to a junction of the n-type transistors 321-1 and 321-2. The n-type transistor 321-2 on the grounded side is used as the current source, while the n-type transistor 321-1, the capacitor 312, and the amplifier 314 are disposed inside the negative capacitance circuit 310.

In this way, because the n-type transistor 321 of the current source is split into the two n-type transistors 321-1 and 321-2, and one of which is used instead of the n-type transistor 313, the total transistor area can be reduced by an amount equal to the n-type transistor 313. Note that the n-type transistor 321-1 is one example of the inserted transistor described in the claims.

Figure 11:
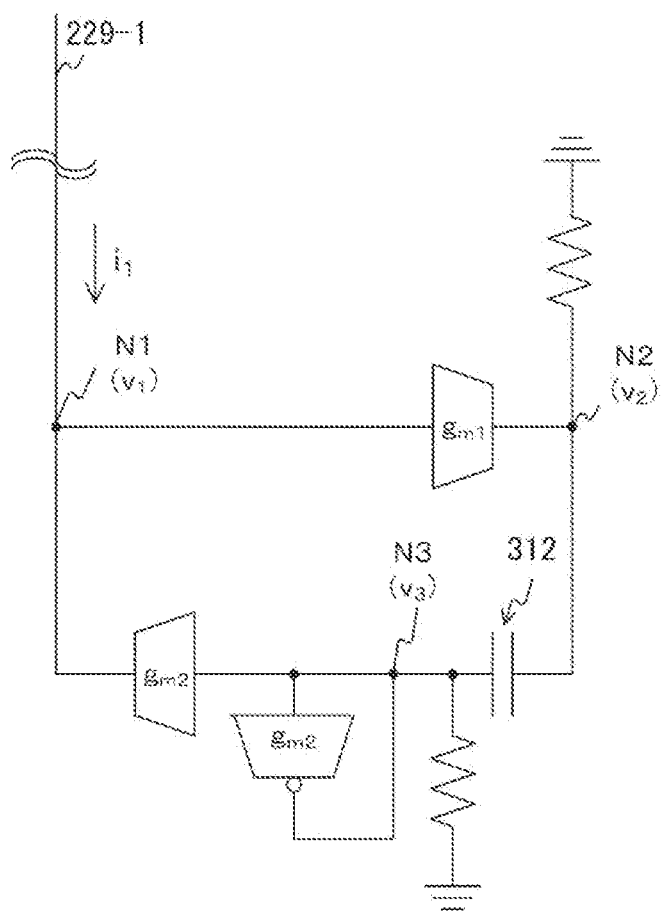
FIG. 11 is a circuit diagram illustrating one example of a linear model according to the third embodiment of the present technology.

FIG. 11 is a circuit diagram illustrating one exemplary configuration of a linear model according to the third embodiment of the present technology. The circuit in FIG. 10 can be expressed by the linear model in FIG. 11. The linear model according to the third embodiment differs from the second embodiment in that the resistance value of the path between the node N3 and the terminal of the reference potential is $R_2$. The following charge conservation formulas hold for each of the nodes.

$$g_{m1}v_1 = v_2/R + sC(v_2 - v_3) \qquad \text{Formula 12}$$

[Math. 9]

$$sC(v_2 - v_3) = \left(g_{m2} + \frac{1}{R_2}\right)v_3 \equiv g'_{m2}v_3 \qquad \text{Formula 13}$$

$$i_1 = -g_{m2}v_3 \qquad \text{Formula 14}$$

A comparison between Formulas 1 to 3 of the second embodiment and Formulas 12 to 14 of the third embodiment reveals a characteristic point in Formula 13, namely the manifestation of an effective transconductance $g'_{m2}$. Transforming Formula 13 gives the following formula.

[Math. 10]

$$v_3 = \frac{s\dfrac{C}{g'_{m2}}}{1 + s\dfrac{C}{g'_{m2}}} \cdot v_2 \qquad \text{Formula 15}$$

According to Formula 15, the linear model is a high-pass filter with a pole at the angular frequency $g'_{m2}/C$. Also, the following formula is obtained from Formulas 12 and 14.

[Math. 11]

$$v_2 = g_{m1}R \cdot \frac{1 + s\dfrac{C}{g_{m2}}}{1 + s\dfrac{C}{g_{m2}}(1 + g_{m2}R)} v_1 \qquad \text{Formula 16}$$

According to Formula 16, the linear model has transmission characteristics of having a zero point at the angular frequency $g_{m2}/C$, and having a pole at the lower angular frequency $g_{m2}/\{C(1+g_{m2}R)\}$. If Formulas 15 and 16 are substituted into Formula 14, the following formula is obtained.

[Math. 12]

$$i_1 = -g_{m1}g_{m2}R \cdot \frac{s\dfrac{C}{g_{m2}}}{1 + s\left(\dfrac{C}{g_{m2}} + RC\right)} \cdot \frac{1 + s\dfrac{C}{g_{m2}}}{1 + s\dfrac{C}{g'_{m2}}} v_1 \qquad \text{Formula 17}$$

According to Formula 17, an impedance Z of the linear model as the load is expressed by the following formula.

[Math. 13]

$$Z = \frac{v_1}{i_1} = -\frac{1}{g_{m2}} \frac{1}{g_{m1}R} \cdot \frac{1 + s\dfrac{C}{g_{m2}}(1 + g_{m2}R)}{s\dfrac{C}{g'_{m2}}} \cdot \frac{1 + s\dfrac{C}{g'_{m2}}}{1 + s\dfrac{C}{g_{m2}}} \qquad \text{Formula 18}$$

Next, the parameters unique to the third embodiment, namely the resistance $R_2$ and the transconductance $g_{m2}$, are computed. First, because the transconductance $g_{m2}$ is involved in a saturation operation, the following formula holds.

$$I_d = (k/A) \cdot (V_g - V - V_{th})^2 \qquad \text{Formula 19}$$

In the above formula, $I_d$ is the drain current of the n-type transistor 321-1 or 321-2, A is the ratio of the gate length of each of the n-type transistors 321-1 and 321-2, or in other words, the split ratio, k is a predetermined coefficient, $V_g$ is the gate voltage, V is the voltage of the split node, and $V_{th}$ is the threshold voltage. The units of the above voltages are volts (V), for example.

Transforming Formula 19 gives the following formula.

$$V = V_g - V_{th} - (A \cdot I_d/k)^{1/2} \qquad \text{Formula 20}$$

Also, differentiating both sides of Formula 19 gives the following formula.

$$\begin{aligned} I_d &= 2(k/A) \cdot (V_g - V - V_{th}) \\ &= 2\{(k \cdot Id)/A\}^{1/2} \\ &= (1/A^{1/2}) \cdot g_{m\_LM0} \end{aligned} \qquad \text{Formula 21}$$

In the above formula, $g_{m\_LM0}$ is the transconductance of the n-type transistor 321 before the split.

Next, with regard to the resistance $R_2$, because the n-type transistor 321-2 corresponding to the resistance $R_2$ is in the triode region, the following formula holds.

$$I_d = \{(2k/(1-A))\} \cdot \{(V_g - V_{th})V - V^2/2\} \qquad \text{Formula 22}$$

The following formula is obtained from Formulas 20 and 22.

$$\begin{aligned} R_2 &= \{(1-A)/2k\} \cdot \{1/(V_g - V_{th} - V)\} \\ &= \{(1-A)/2\} \cdot \{1/(A \cdot k \cdot Id)\}^{1/2} \\ &= \{(1-A)/(2A^{1/2})\} \cdot (1/g_{m\_LM0}) \end{aligned} \qquad \text{Formula 23}$$

Also, the following formula for $g'_{m2}$ is obtained in a similar manner.

$$g'_{m2} = g_{m2} + 1/R_2 \quad \text{Formula 24}$$
$$= \{1/A^{1/2} + 2A^{1/2}/(1-A)\} \cdot g_{m\_LM0}$$
$$= (1/A^{1/2})\{(1+A)/(1-A)\} \cdot g_{m\_LM0}$$

Also, according to Formula 18, the impedance Z in a low-frequency band is expressed by the following formula.

[Math. 14]

$$Z \cong -\frac{1}{g_{m1}R} \cdot \frac{g'_{m2}}{g_{m2}} \cdot \frac{1}{sC} \quad \text{when } |s| \ll \sqrt{\frac{g_{m2}}{C(1+g_{m2}R)}} \quad \text{Formula 25}$$

In the above formula, $g_{m1} \cdot R$ represents the gain of the amplifier 314. Assuming that a source follower with a gain of "1" is used as the amplifier 314, Formula 25 is expressed by the following formula.

[Math. 15]

$$Z \cong -\frac{g'_{m2}}{g_{m2}} \cdot \frac{1}{sC} \quad \text{when } |s| \ll \sqrt{\frac{g_{m2}}{C(1+g_{m2}R)}} \quad \text{Formula 26}$$

According to Formula 26, the negative capacitance circuit 310 has a negative capacitance of $-(g_m/g'_{m2}) \cdot C$. Unlike the second embodiment, a coefficient expressed as the transconductance ratio $g_m/g'_{m2}$ is manifested in the negative capacitance of the third embodiment. The coefficient is the gain of the negative capacitance. The negative capacitance gain is expressed by the following formula.

$$g_m/g'_{m2} = (1-A)/(1+A) \quad \text{Formula 27}$$

Figure 12:
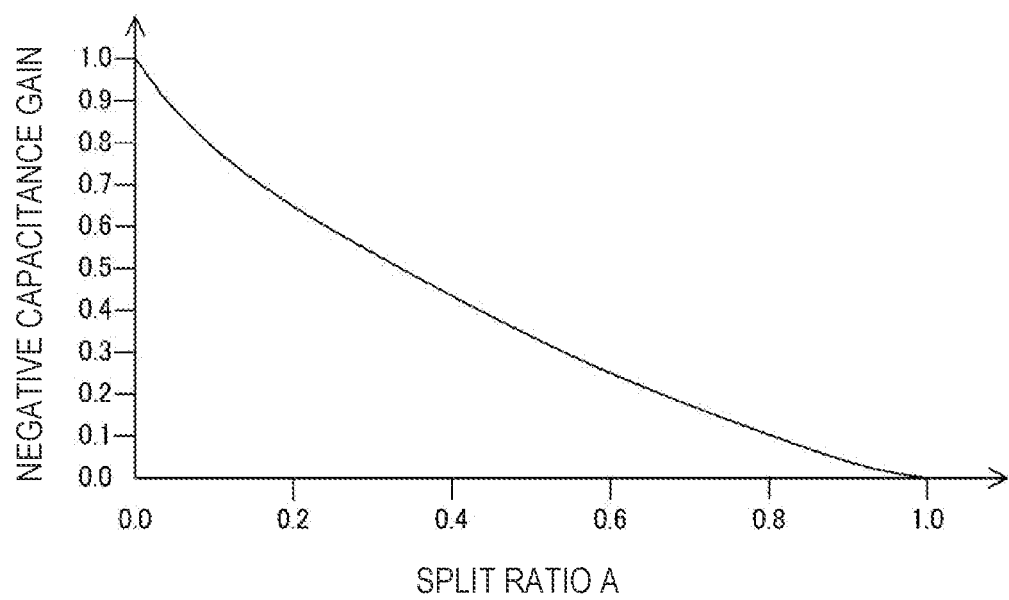
FIG. 12 is a graph illustrating one example of the gain characteristics of the negative capacitance circuit according to the third embodiment of the present technology.

FIG. 12 is a graph illustrating one example of the gain characteristics of the negative capacitance circuit 310 according to the third embodiment of the present technology. The vertical axis in the diagram is the negative capacitance gain exemplified in Formula 27, while the horizontal axis is a split ratio A.

Also, according to Formula 18, the impedance Z in a high-frequency band is expressed by the following formula.

[Math. 16]

$$Z \cong -\frac{1}{g_{m2}} \frac{1+g_{m2}R}{g_{m1}R} \quad \text{when } |s| \gg \sqrt{\frac{g'_{m2}}{C}} \quad \text{Formula 28}$$

According to Formula 28, in the third embodiment, the impedance Z is a negative resistance, similarly to the second embodiment. Assuming that a source follower with a gain of "1" is used as the amplifier 314, the impedance Z is expressed by the following formula.

[Math. 17]

$$Z \cong -\left(\frac{1}{g_{m1}} + \frac{1}{g_{m2}}\right) \quad \text{when } |s| \gg \sqrt{\frac{g'_{m2}}{C}} \quad \text{Formula 29}$$

Similarly, consider an intermediate-frequency band expressed by the following formula.

[Math. 18]

$$\frac{g_{m2}}{C(1+g_{m2}R)} \ll |s| \ll \frac{g_{m2}}{C} \quad \text{Formula 30}$$

The impedance Z in the intermediate-frequency band indicated in Formula 30 is expressed by the following formula.

$$Z = v_1/i_1 \quad \text{Formula 31}$$
$$= -(g_m/g'_{m2}) \cdot (1/g_{m1} + 1/g_{m2})$$
$$= -\{(1+A)/(1-A)\} \cdot (1/g_{m1} + 1/g_{m2})$$

According to Formula 31, in the intermediate-frequency band, the impedance Z becomes a negative resistance.

Figure 13:
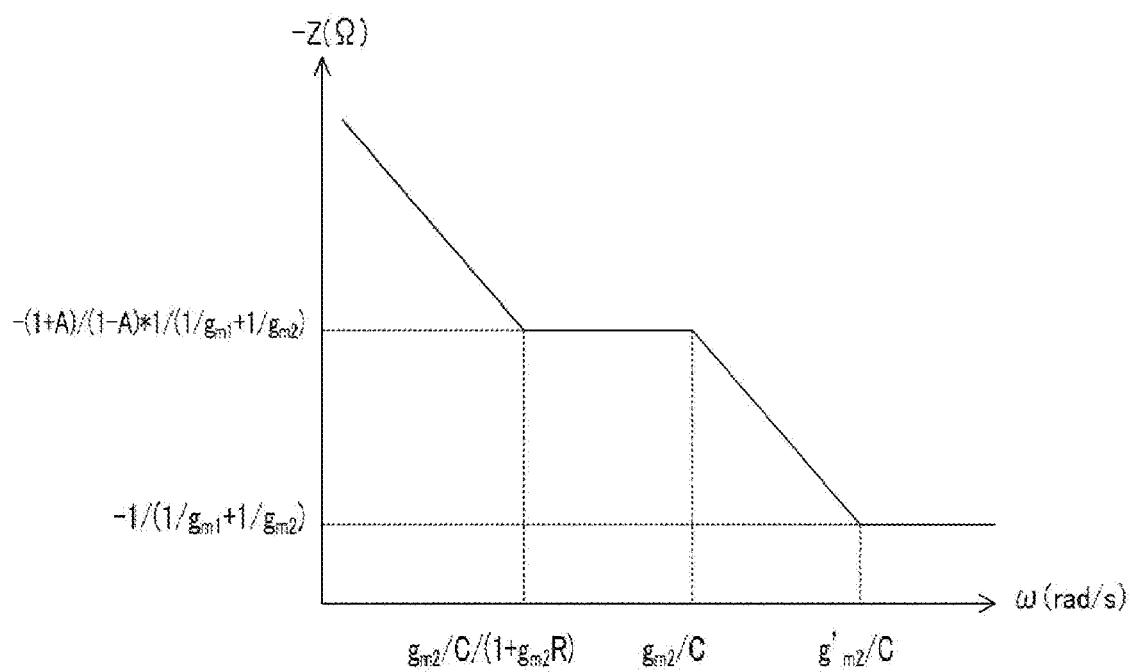
FIG. 13 is a graph illustrating one example of the impedance characteristics of the negative capacitance circuit according to the third embodiment of the present technology.

FIG. 13 is a graph illustrating one example of the impedance characteristics of the negative capacitance circuit 310 according to the third embodiment of the present technology. The vertical axis in the diagram represents the impedance Z, while the horizontal axis represents the angular frequency. The graph in the diagram is obtained from Formulas 26, 29, and 31. As exemplified in the diagram, two poles and two zero-points are manifested in the impedance characteristics of the negative capacitance circuit 310.

In this way, in the third embodiment of the present technology, because the n-type transistor 321 is split in two transistors, one of which is disposed inside the negative capacitance circuit 310, the n-type transistor 313 can be removed.

4. Fourth Embodiment

In the third embodiment described above, the amplifier 314 with a gain of "1" is disposed inside the negative capacitance circuit 310, but with this configuration, there is a risk that a sufficiently large negative capacitance value may not be obtained. The negative capacitance circuit 310 of the fourth embodiment differs from the third embodiment in that the negative capacitance value is increased.

Figure 14:
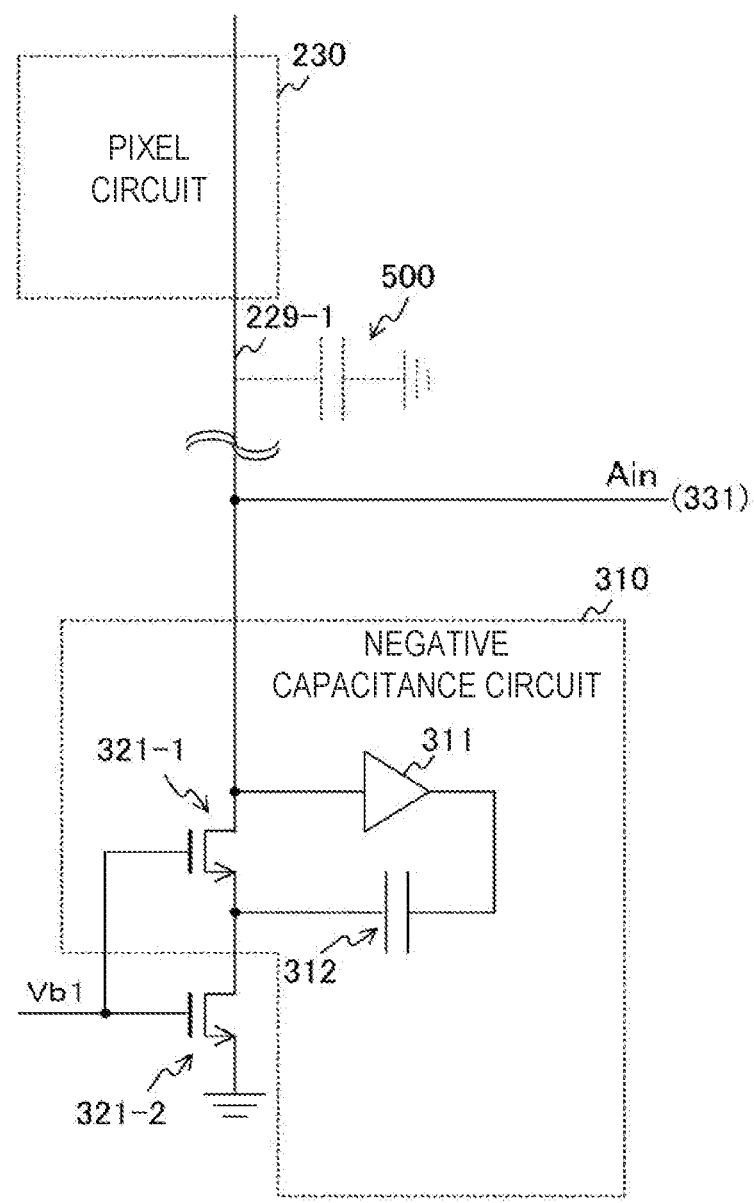
FIG. 14 is a circuit diagram illustrating one exemplary configuration of a negative capacitance circuit according to the fourth embodiment of the present technology.

FIG. 14 is a circuit diagram illustrating one exemplary configuration of a negative capacitance circuit 310 according to the fourth embodiment of the present technology. The negative capacitance circuit 310 according to the fourth embodiment differs from the third embodiment in that the amplifier 311 with a gain greater than "1" is disposed instead of the amplifier 314. By disposing the amplifier 311, the negative capacitance value becomes greater than in the case of the third embodiment. However, from the perspective of maintaining stability, it is desirable to restrain the output impedance (that is, the resistance R in the linear model).

In this way, in the fourth embodiment of the present technology, the amplifier 311 with a gain greater than "1" is disposed, thereby making it possible to increase the negative capacitance value.

5. Fifth Embodiment

In the fourth embodiment described above, the capacitor 312 is disposed outside of the ADC 331 in every column, but there is a risk that the circuit size will increase as the number of columns increases. For example, in the case of configuring the ADC to have a built-in capacitor(s), the circuit size can be reduced by causing the capacitor(s) to be shared by the ADC and the negative capacitance circuit 310. The negative capacitance circuit 310 according to the fifth embodiment differs from the fourth embodiment in that capacitors are shared with the ADC.

Figure 15:
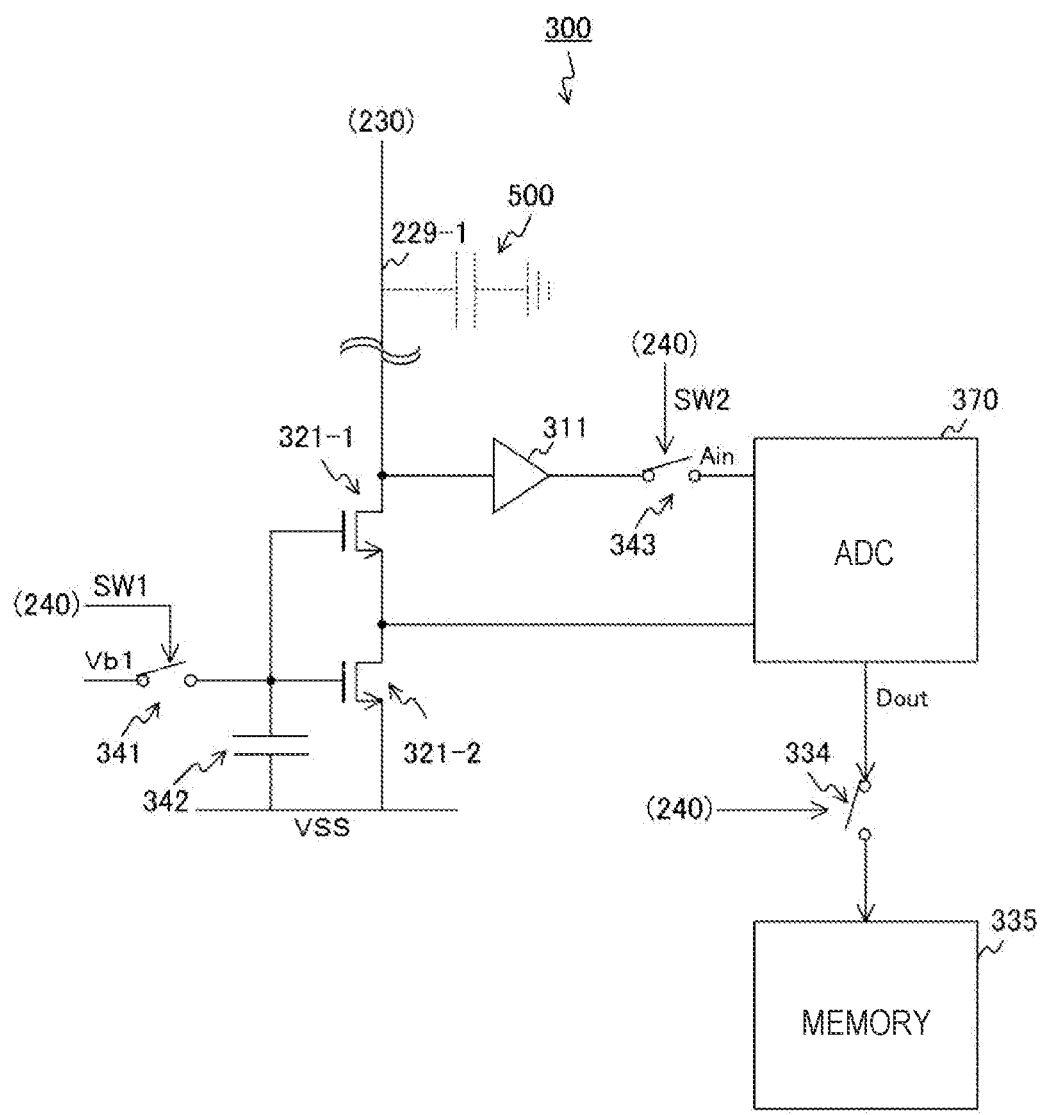
FIG. 15 is a block diagram illustrating one exemplary configuration of a column signal processing unit according to the fifth embodiment of the present technology.

FIG. 15 is a block diagram illustrating one exemplary configuration of a column signal processing unit 300 according to the fifth embodiment of the present technology. The column signal processing unit 300 according to the fifth embodiment differs from the fourth embodiment in that an ADC 370 is disposed instead of the ADC 331, the capacitor 312 is not provided, and switches 341 and 343 as well as a capacitor 342 are additionally disposed.

The bias voltage Vb1 is applied to one terminal of the switch 341, and the other terminal is connected in common to the gates of both of the n-type transistors 321-1 and 321-2. The switch 341, obeying a control signal SW1 from the timing control unit 240, opens and closes a path between the source of the bias voltage Vb1 and the gates of both of the n-type transistors 321-1 and 321-2.

One terminal of the capacitor 342 is connected in common to the gates of both of the n-type transistors 321-1 and 321-2, and the other terminal is connected to a terminal of a reference potential VSS.

The switch 343, obeying a control signal SW2 from the timing control unit 240, opens and closes a path between the output terminal of the amplifier 311 and the ADC 370. Note that the switch 343 is one example of a first switch described in the claims.

Figure 16:
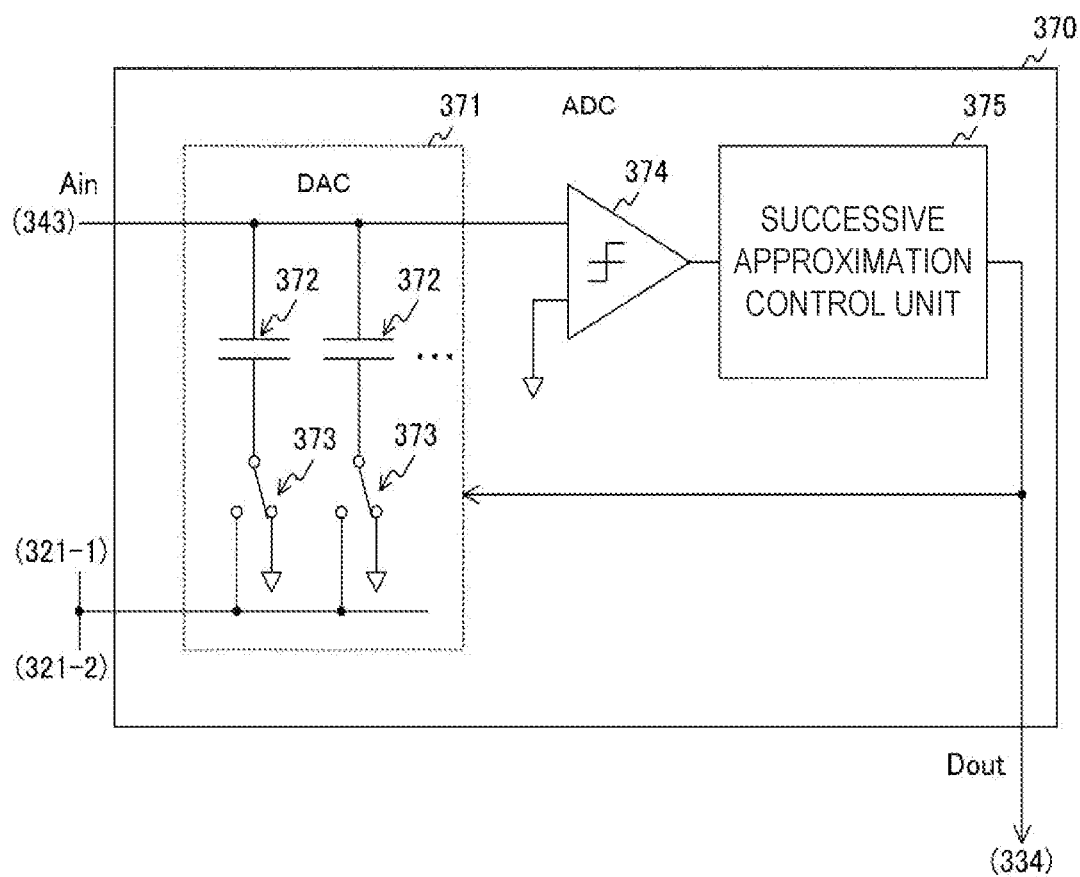
FIG. 16 is a circuit diagram illustrating one exemplary configuration of the ADC according to the fifth embodiment of the present technology.

FIG. 16 is a circuit diagram illustrating one exemplary configuration of the ADC 370 according to the fifth embodiment of the present technology. The ADC 370 is provided with a DAC 371, a comparator 374, and a successive approximation control unit 375.

The DAC 371 performs digital-to-analog (DA) conversion, and is provided with a plurality of capacitors 372 having mutually different capacitances, and switches 373 equal in number to the capacitors 372.

One terminal of each of the capacitors 372 is connected in common to a path between the switch 343 and an input terminal of the comparator 374. On the basis of the digital signal Dout, the switches 373 connect the other terminal of the respectively corresponding capacitors 372 to either the junction of the n-type transistors 321-1 and 321-2 or a terminal of a predetermined reference potential (such as ground potential). Note that the switches 373 are one example of a second switch described in the claims.

The comparator 374 compares the potential of the analog signal Ain from the DAC 371 to a predetermined reference potential (such as ground potential). The comparator 374 outputs the comparison result to the successive approximation control unit 375.

The successive approximation control unit 375 generates the digital signal Dout containing the comparison result from the comparator 374, and outputs the digital signal Dout as feedback to the DAC 371 while also outputting to the switch 334. Note that the circuit including the comparator 374 and the successive approximation control unit 375 is one example of the logic circuit described in the claims.

For example, in an initial state, all of the switches 373 connect the destinations of the respectively corresponding capacitors 372 to the junction of the n-type transistors 321-1 and 321-2. Subsequently, in a case where the analog signal Ain is greater than the reference potential, the successive approximation control unit 375 generates a first bit of the digital signal Dout. Obeying the first bit, one of the switches 373 switches the destination of the capacitor 372 with the highest capacitance to the ground potential, causing the capacitor 372 to discharge.

After the generation of the first bit, in a case where the analog signal Ain is greater than the reference potential, the successive approximation control unit 375 generates a second bit of the digital signal Dout. Obeying the second bit, one of the switches 373 switches the destination of the capacitor 372 with the second-highest capacitance to the ground potential, causing the capacitor 372 to discharge. Thereafter, similar control is executed repeatedly. Additionally, in the case in which the analog signal Ain is equal to or less than the reference potential, the switches 373 do not cause the capacitors 372 to discharge, and the comparison operations end. In the case in which the digital signal Dout has 16 bits per pixel, the number of comparisons is 16 at maximum, and in cases where the comparison operations end partway through, the remaining bits are set to a fixed value. In this way, an ADC that successively executes a comparison operation for every bit is called a successive approximation ADC.

Figure 17:
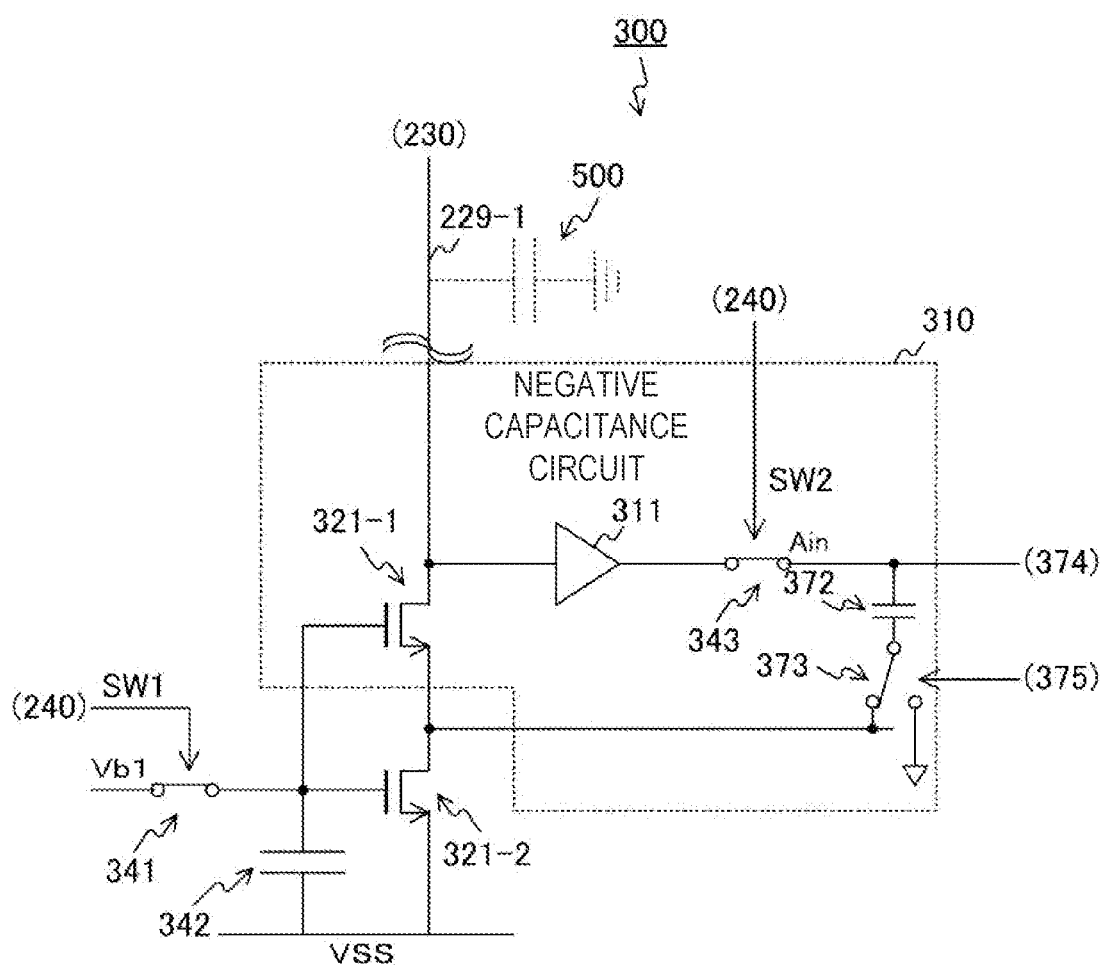
FIG. 17 is a diagram illustrating one example of the state of the column signal processing unit in periods other than an AD conversion period according to the fifth embodiment of the present technology.

FIG. 17 is a diagram illustrating one example of the state of the column signal processing unit 300 in periods other than an AD conversion period according to the fifth embodiment of the present technology. Before AD conversion starts, or after AD conversion ends, the timing control unit 240 uses the control signals SW1 and SW2 to put the switches 341 and 343 in the closed state. With this arrangement, the circuit containing the n-type transistor 321-1, the amplifier 311, the switch 343, and the capacitors 372 becomes a configuration similar to the negative capacitance circuit 310 according to the fourth embodiment.

Also, the analog signal Ain is stored in the capacitors 372. In this way, the negative capacitance circuit 310 according to the fifth embodiment shares the capacitors 372 with the ADC 370. For this reason, it is no longer necessary to dispose the capacitor 312 outside of the ADC 370, and the circuit size of the column signal processing unit 300 can be reduced.

Note that the timing control unit 240 puts the switch 341 in the open state and stops the supply of the bias voltage Vb1 in the AD conversion period, but a configuration that supplies the bias voltage Vb1 continuously without providing the switch 341 itself is also possible. However, there is a risk of a longer charging time of the capacitor 342 and also increased power consumption.

Figure 18:
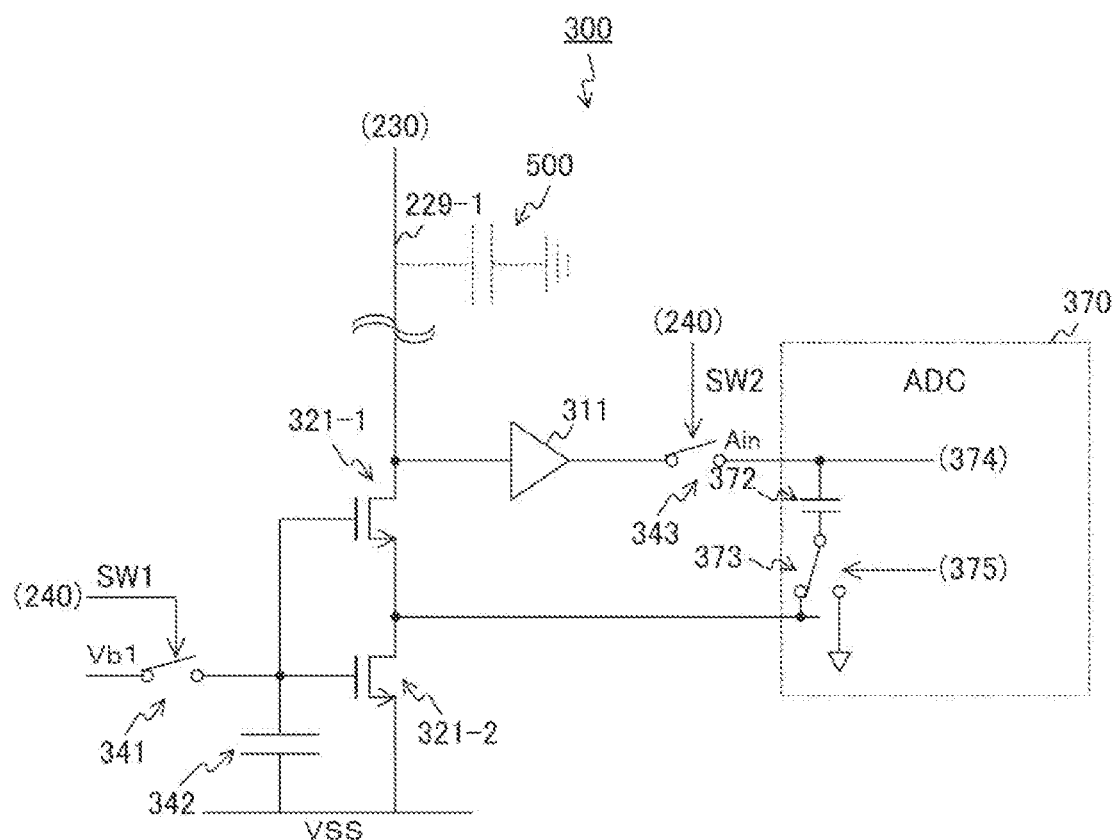
FIG. 18 is a diagram illustrating one example of the state of the column signal processing unit in the AD conversion period according to the fifth embodiment of the present technology.

FIG. 18 is a diagram illustrating one example of the state of the column signal processing unit 300 in the AD conversion period according to the fifth embodiment of the present technology. During the AD conversion period, the timing control unit 240 uses the control signals SW1 and SW2 to put the switches 341 and switch 343 in the open state. With this arrangement, the circuit containing the n-type transistor 321-1, the amplifier 311, the switch 343, and the capacitors 372 ceases to be a loop circuit, and the capacitance also ceases to be negative. Also, the ADC 370 converts the analog signal Ain stored in the capacitors 372 to the digital signal Dout by successive approximation control.

By opening and closing the switch 343 as exemplified in FIGS. 17 and 18, the negative capacitance circuit 310 can be enabled or disabled. Herein, "enabled" means that the capacitance of the negative capacitance circuit 310 is negative.

In this way, in the fifth embodiment of the present technology, because the capacitors 372 are shared by the negative capacitance circuit 310 and the ADC 370, it is not necessary to dispose the capacitor 312 outside of the ADC 370. With this arrangement, the circuit size of the column signal processing unit 300 can be reduced compared to the case of disposing the capacitor 312 outside of the ADC 370.

Modifications

In the fifth embodiment described above, the switch 343 for enabling the negative capacitance circuit 310 is connected to the output terminal of the amplifier 311, but the switch 343 can be disposed at another location insofar as the location is on the loop path. For example, the switch 343 can also be disposed between the junction of the n-type transistors 321-1 and 321-2 and the ADC 370. The column signal processing unit 300 in the modification of the fifth embodiment differs from the fifth embodiment in that the disposed location of the switch 343 is different.

Figure 19:
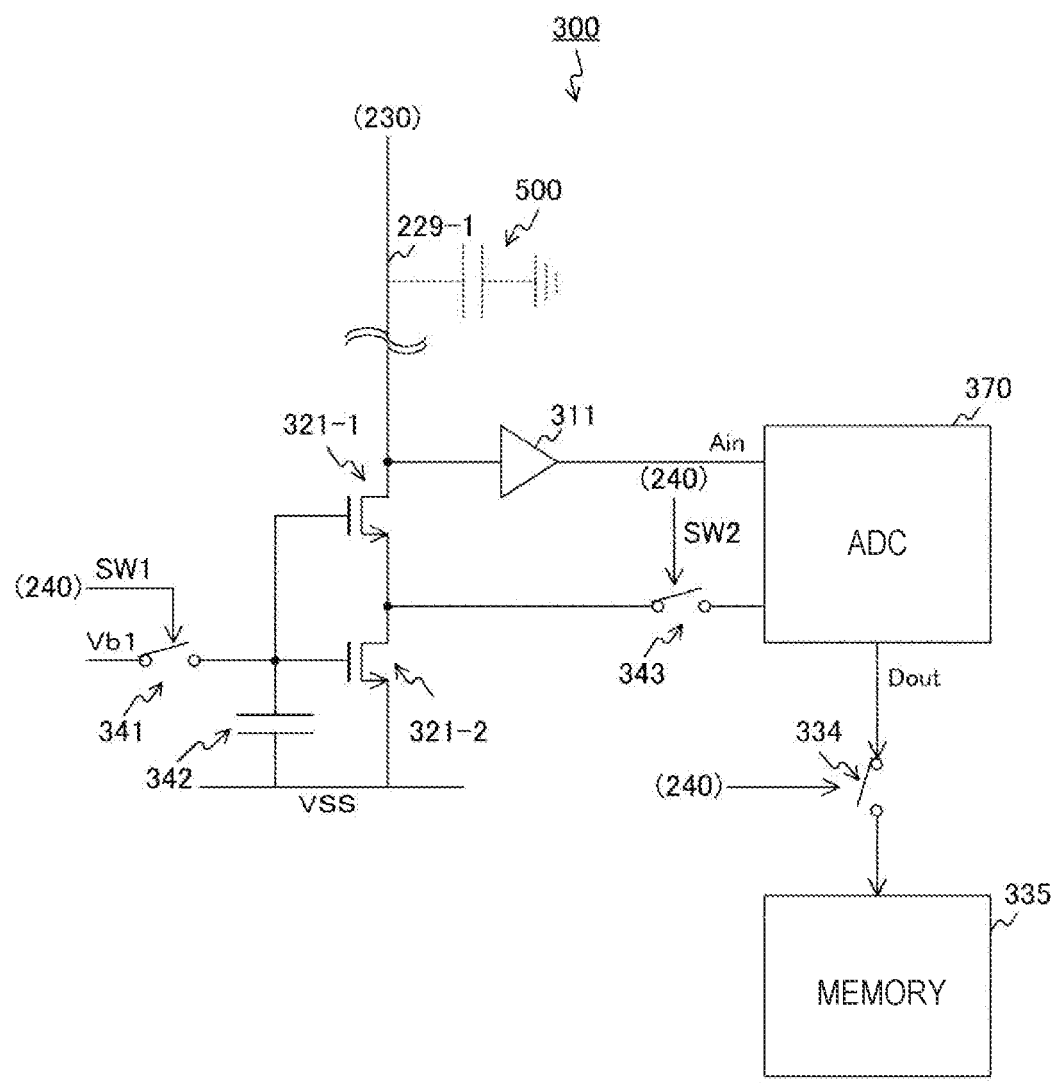
FIG. 19 is a block diagram illustrating one exemplary configuration of the column signal processing unit according to a modification of the fifth embodiment of the present technology.

FIG. 19 is a block diagram illustrating one exemplary configuration of a column signal processing unit 300 according to a modification of the fifth embodiment of the present technology. The column signal processing unit 300 according to the modification of the fifth embodiment differs from the fifth embodiment in that the switch 343 is disposed on the path between the junction of the n-type transistors 321-1 and 321-2 and the ADC 370.

Figure 20:
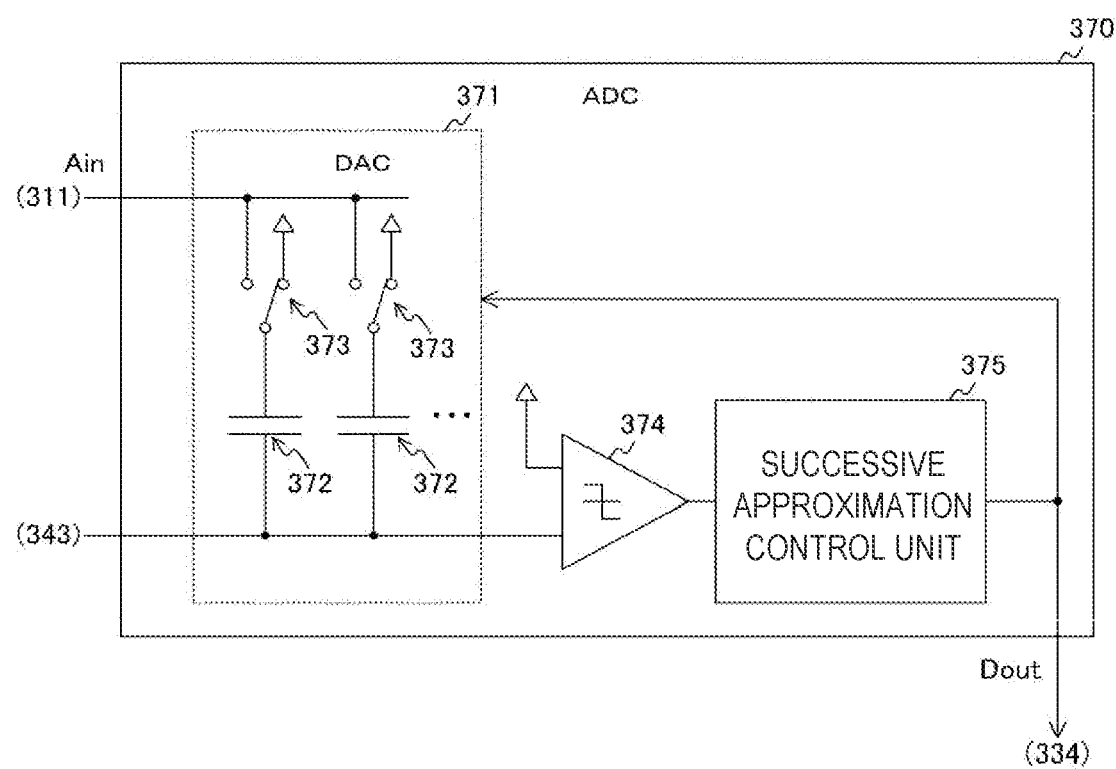
FIG. 20 is a circuit diagram illustrating one exemplary configuration of the ADC according to a modification of the fifth embodiment of the present technology.

FIG. 20 is a circuit diagram illustrating one exemplary configuration of the ADC 370 according to a modification of the fifth embodiment of the present technology. In the ADC 370 according to the modification of the fifth embodiment, one terminal of each of the capacitors 372 is connected in common to a path between the switches 373 and the comparator 374. Also, on the basis of the digital signal Dout, the switches 373 connect the other terminal of each of the capacitors 372 to either the amplifier 311 or a terminal of a reference potential.

In this way, according to the modification of the fifth embodiment of the present technology, because the switch 343 is disposed on the path between the junction of the n-type transistors 321-1 and 321-2 and the ADC 370, the path can be opened and closed. With this arrangement, the negative capacitance circuit 310 can be enabled or disabled.

6. Sixth Embodiment

In the fifth embodiment described above, the negative capacitance circuit 310 shares the capacitors 372 with the ADC 370, but the negative capacitance circuit 310 may also share the capacitors 372 with a circuit other than the ADC. For example, the negative capacitance circuit 310 may share capacitors with a sample-and-hold circuit. The negative capacitance circuit 310 according to the sixth embodiment differs from the fifth embodiment in that capacitors are shared with a sample-and-hold circuit.

Figure 21:
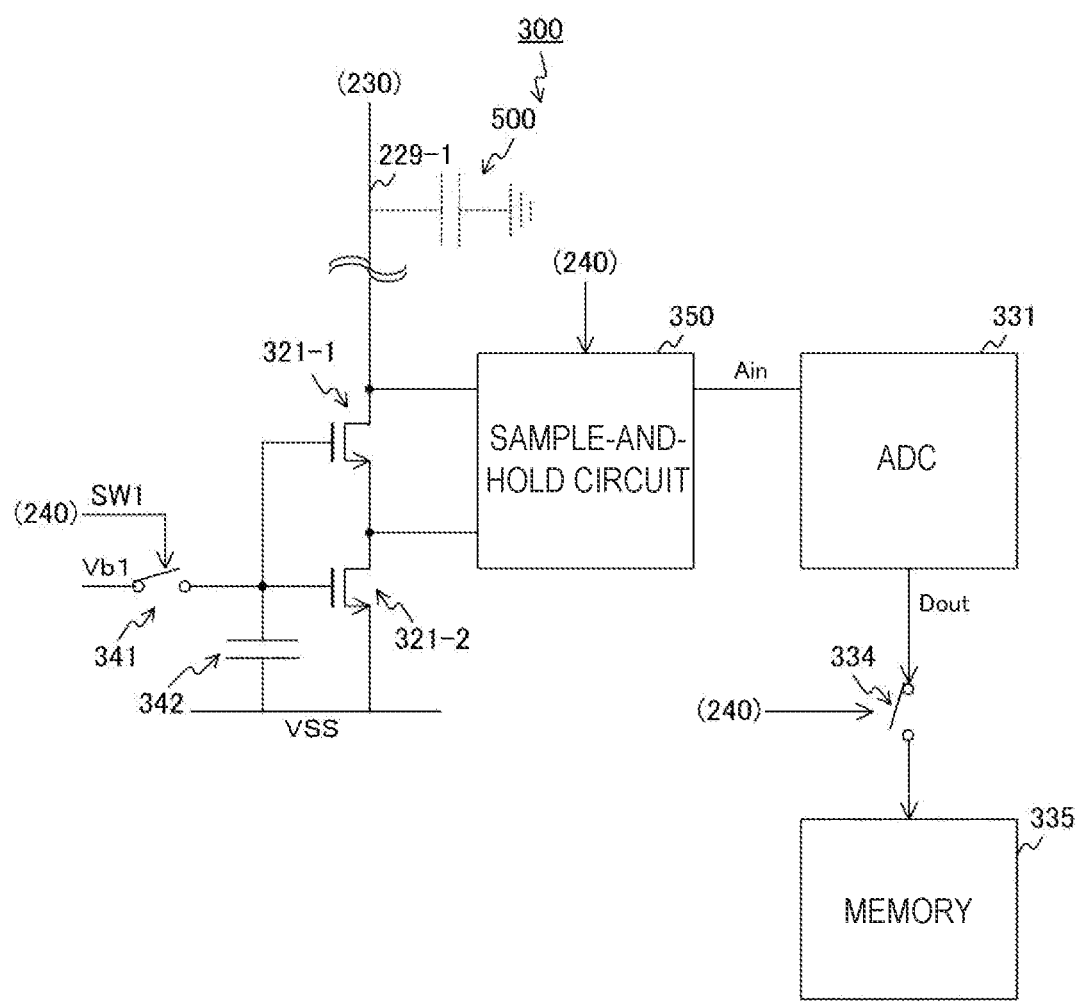
FIG. 21 is a block diagram illustrating one exemplary configuration of a column signal processing unit according to the sixth embodiment of the present technology.

FIG. 21 is a block diagram illustrating one exemplary configuration of a column signal processing unit 300 according to the sixth embodiment of the present technology. The column signal processing unit 300 according to the sixth embodiment differs from the fifth embodiment in that the amplifier 311 and the switch 343 are not provided, and a sample-and-hold circuit 350 is additionally disposed. Also, a non-successive-approximation ADC 331 is provided instead of the ADC 370. Note that the successive approximate ADC 370 may also be disposed similarly to the fifth embodiment.

The sample-and-hold circuit 350 acquires (that is, samples) and holds an analog signal from one of the vertical signal lines 229-n. The sample-and-hold circuit 350 supplies the held analog signal Ain to the ADC 331.

Figure 22:
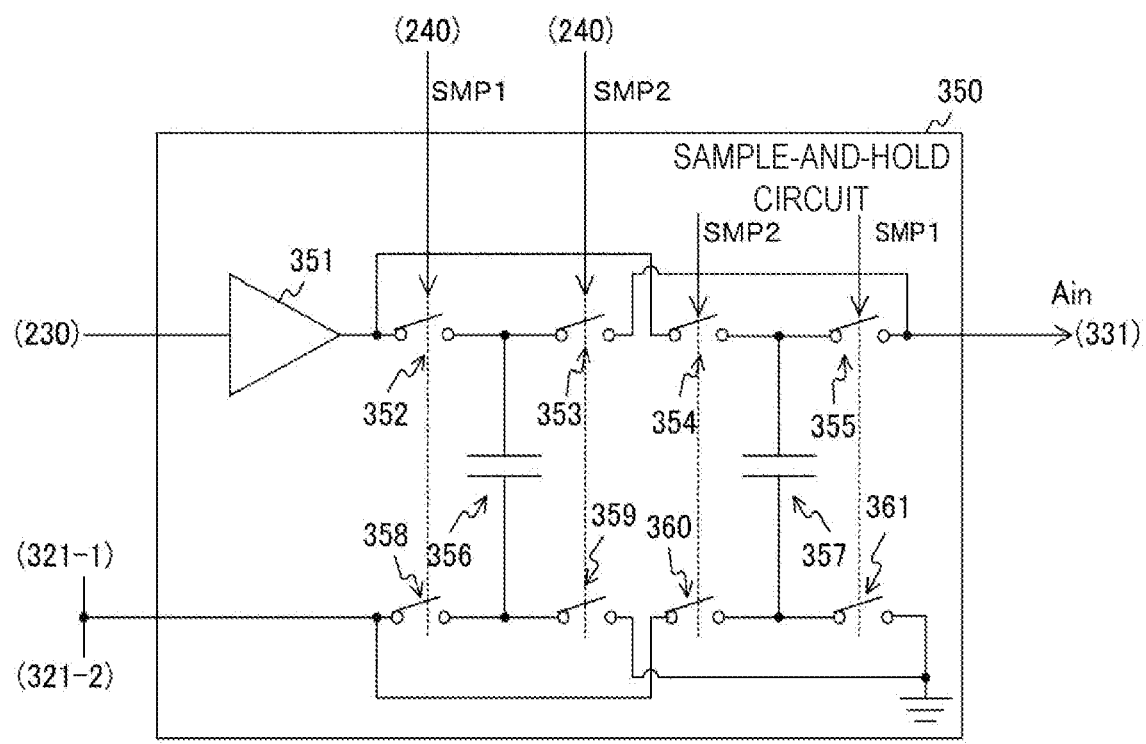
FIG. 22 is a circuit diagram illustrating one exemplary configuration of the sample-and-hold circuit according to the sixth embodiment of the present technology.

FIG. 22 is a circuit diagram illustrating one exemplary configuration of the sample-and-hold circuit 350 according to the sixth embodiment of the present technology. The sample-and-hold circuit 350 is provided with an amplifier 351, switches 352 to 355, capacitors 356 and 357, and switches 358 to 361.

The input terminal of the amplifier 351 is connected to the pixel circuits 230 via the vertical signal line 229-n, and the output terminal is connected to the switches 352 and 354. The switch 352, obeying a control signal SMP1 from the timing control unit 240, opens and closes a path between one terminal of the capacitor 356 and the amplifier 351. The switch 353, obeying a control signal SMP2 from the timing control unit 240, opens and closes a path between one terminal of the capacitor 356 and the ADC 331.

Also, the switch 354, obeying a control signal SMP2, opens and closes a path between one terminal of the capacitor 357 and the amplifier 351. The switch 355, obeying the control signal SMP1, opens and closes a path between one terminal of the capacitor 357 and the ADC 331.

The switch 358, obeying the control signal SMP1, opens and closes a path between the other terminal of the capacitor 356 and a junction of the n-type transistors 321-1 and 321-2. The switch 359, obeying the control signal SMP2, opens and closes a path between the other terminal of the capacitor 356 and a terminal of a reference potential (such as ground potential).

Also, the switch 360, obeying the control signal SMP2, opens and closes a path between the other terminal of the capacitor 357 and a junction of the n-type transistors 321-1 and 321-2. The switch 361, obeying the control signal SMP1, opens and closes a path between the other terminal of the capacitor 357 and the terminal of the reference potential.

Figure 23:
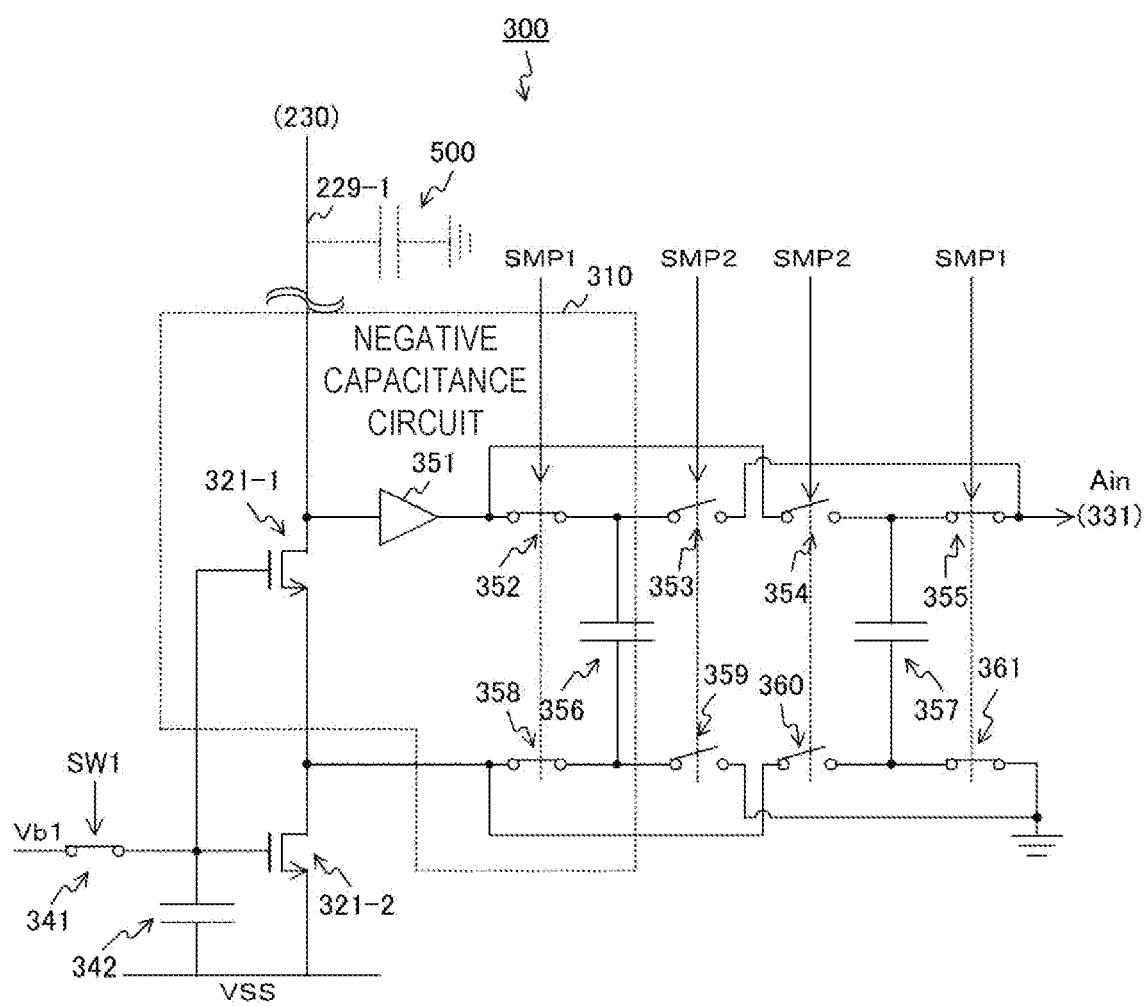
FIG. 23 is a diagram illustrating one example of the state of the column signal processing unit in an odd-numbered sampling period according to the sixth embodiment of the present technology.

FIG. 23 is a diagram illustrating one example of the state of the column signal processing unit 300 in an odd-numbered sampling period according to the sixth embodiment of the present technology. During odd-numbered sampling periods, the timing control unit 240 uses the control signal SMP1 to put the switches 352, 355, 358, and 361 in the closed state, and uses the control signal SMP2 to put the remaining switches in the open state. With this arrangement, the circuit containing the n-type transistor 321-1, the amplifier 351, the switch 352, the capacitor 356, and the switch 358 becomes a circuit similar to the negative capacitance circuit 310 according to the fourth embodiment, and the capacitance becomes negative. Also, the capacitor 356 samples the analog signal, while the capacitor 357 holds the signal sampled in an even-numbered sampling period.

Figure 24:
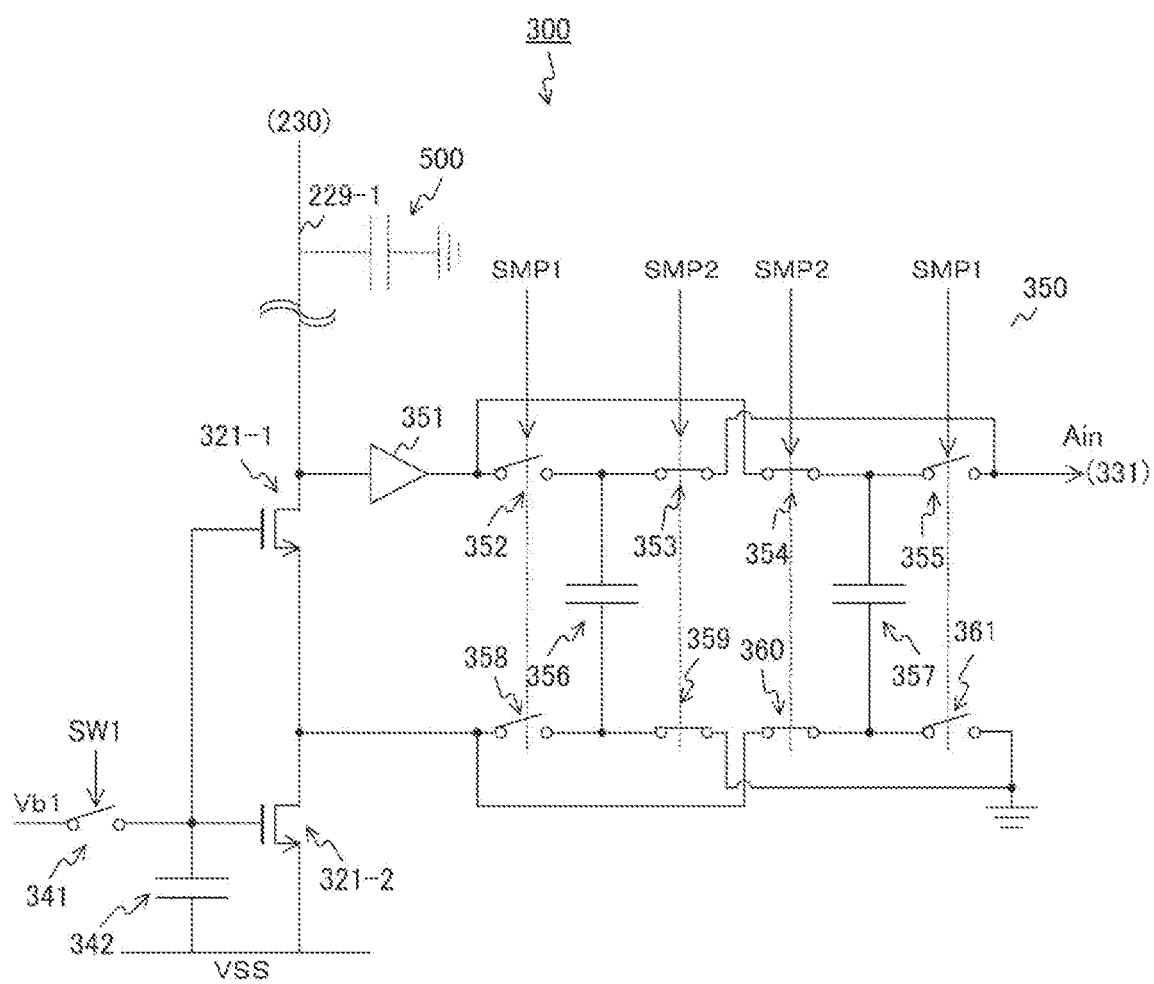
FIG. 24 is a diagram illustrating one example of the state of the column signal processing unit in an even-numbered sampling period according to the sixth embodiment of the present technology.

FIG. 24 is a diagram illustrating one example of the state of the column signal processing unit 300 in an even-numbered sampling period according to the sixth embodiment of the present technology. During even-numbered sampling periods, the timing control unit 240 uses the control signal SMP1 to put the switches 352, 355, 358, and 361 in the open state, and uses the control signal SMP2 to put the remaining switches in the closed state. With this arrangement, the circuit containing the n-type transistor 321-1, the amplifier 351, the switch 354, the capacitor 357, and the switch 360 becomes a circuit similar to the negative capacitance circuit 310 according to the fourth embodiment, and the capacitance becomes negative. Also, the capacitor 356 holds the signal sampled in an odd-numbered period, while the capacitor 357 samples the analog signal.

As described above, in the circuit containing the capacitor 356 and the switches 352, 353, 358, and 359, the switches 352 and 358 on the input side and the switches 353 and 359 on the output side are alternately opened and closed. Such a circuit is referred to as a switched capacitor circuit. Similarly, the circuit containing the capacitor 357 and the switches 354, 355, 360, and 361 also functions as a switched capacitor circuit. Note that although two switched capacitor circuits are disposed, only one may also be disposed. However, in the case where there is only one switched capacitor circuit, the odd-numbered sampling and the even-numbered holding cannot be executed in parallel.

Note that the switches 352 and 354 are one example of a first input-side switch described in the claims, while the switches 358 and 360 are one example of a second input-side switch described in the claims. The switches 353 and 355 are one example of a first output-side switch described in the claims, while the switches 359 and 361 are one example of a second output-side switch described in the claims.

In this way, in the sixth embodiment of the present technology, because the negative capacitance circuit 310 shares capacitors with the sample-and-hold circuit, it is not necessary to dispose the capacitor 312 outside of the sample-and-hold circuit 350. With this arrangement, the circuit size of the column signal processing unit 300 can be reduced compared to the case of disposing the capacitor 312 outside of the sample-and-hold circuit 350.

7. Seventh Embodiment

In the first embodiment described above, the pixel array unit 220 is provided on a single semiconductor chip together with circuits other than the pixel array unit 220, such as the timing control unit 240. However, if the area of the semiconductor chip is fixed, there is a risk that the area of the pixel array unit 220 will be restricted by an amount equal to the area of the circuit(s) other than the pixel array unit 220. To increase the area of the pixel array unit 220, it is sufficient to dispose each of the circuits in the solid-state image sensor 200 in a distributed manner on a laminated plurality of semiconductor chips, for example. The solid-state image sensor 200 according to the seventh embodiment differs from the first embodiment in that the circuits are disposed in a distributed manner on a laminated plurality of semiconductor chips.

Figure 25:
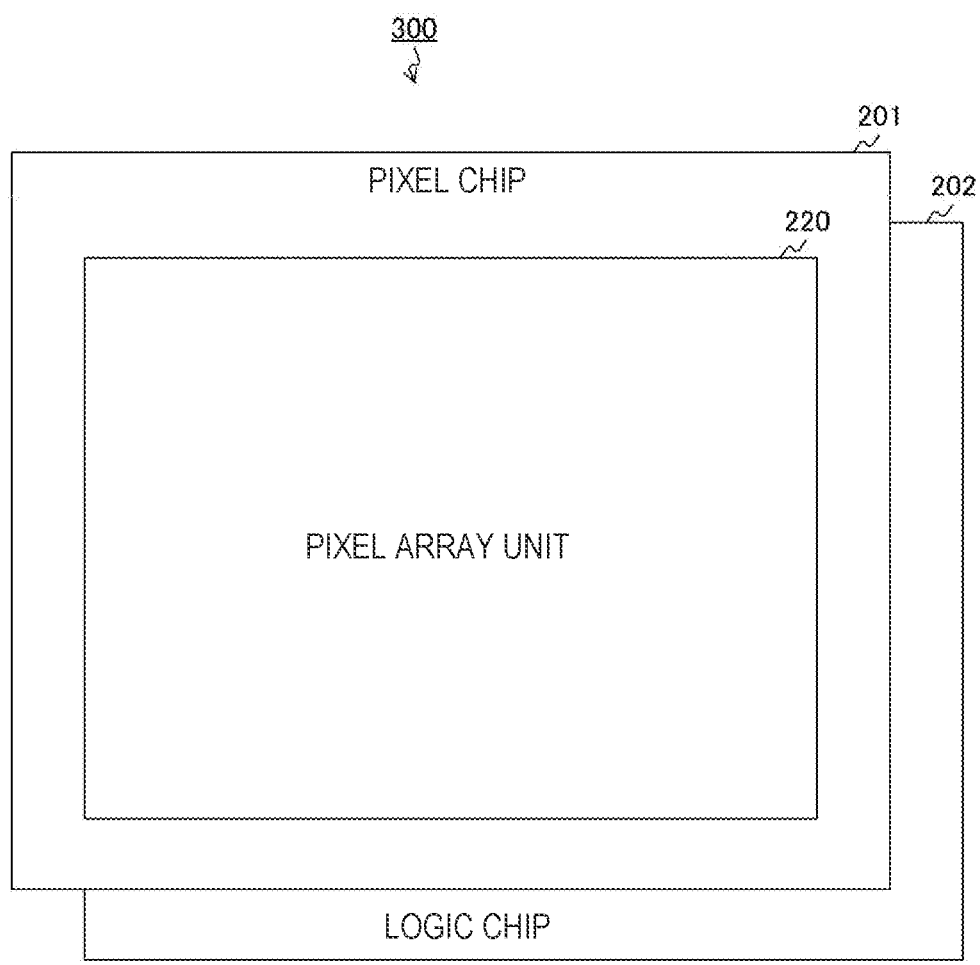
FIG. 25 is a block diagram illustrating one exemplary configuration of a solid-state image sensor according to the seventh embodiment of the present technology.

FIG. 25 is a block diagram illustrating one exemplary configuration of a solid-state image sensor 200 according to the seventh embodiment of the present technology. The solid-state image sensor 200 according to the seventh embodiment is provided with a laminated pixel chip 201 and logic chip 202. The pixel chip 201 is a semiconductor chip on which the pixel array unit 220 is disposed. Note that the pixel chip 201 is one example of a first semiconductor chip described in the claims.

Figure 26:
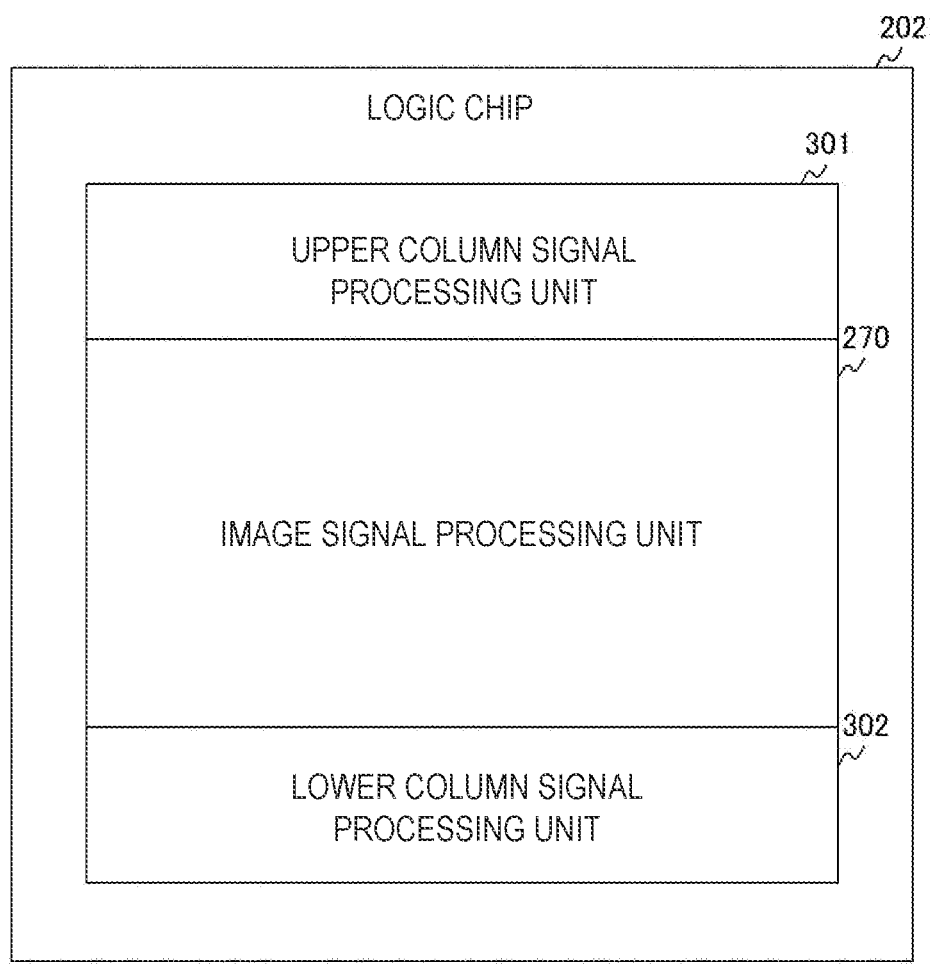
FIG. 26 is a block diagram illustrating one exemplary configuration of a logic chip according to the seventh embodiment of the present technology.

FIG. 26 is a block diagram illustrating one exemplary configuration of a logic chip 202 according to the seventh embodiment of the present technology. The logic chip 202 is a semiconductor chip on which an upper column signal processing unit 301, the image signal processing unit 270, and a lower column signal processing unit 302 are disposed.

Circuits corresponding to half of all the columns in the column signal processing unit 300 are disposed in the upper column signal processing unit 301. On the other hand, circuits corresponding to the remaining columns in the column signal processing unit 300 are disposed in the lower column signal processing unit 302. The vertical driver 210, the DAC 250, and the horizontal transfer scanning circuit 260 are disposed in the logic chip 202, for example, and are omitted from FIG. 26.

In this way, in the seventh embodiment of the present technology, because circuits are disposed in a distributed manner on the laminated pixel chip 201 and logic chip 202, the area of the pixel array unit 220 can be increased compared to the case of disposing the circuits on a single semiconductor chip.

8. Eighth Embodiment

In the second embodiment described above, the negative capacitance circuit 310 is connected to the vertical signal lines 229-$n$ to reduce the line capacitance, but there is a risk that streaking will occur due to fluctuations in the ground current. The solid-state image sensor 200 according to the eighth embodiment differs from the second embodiment in that the drain voltage of the n-type transistor 316 acting as the current source is clamped to suppress streaking.

Figure 27:
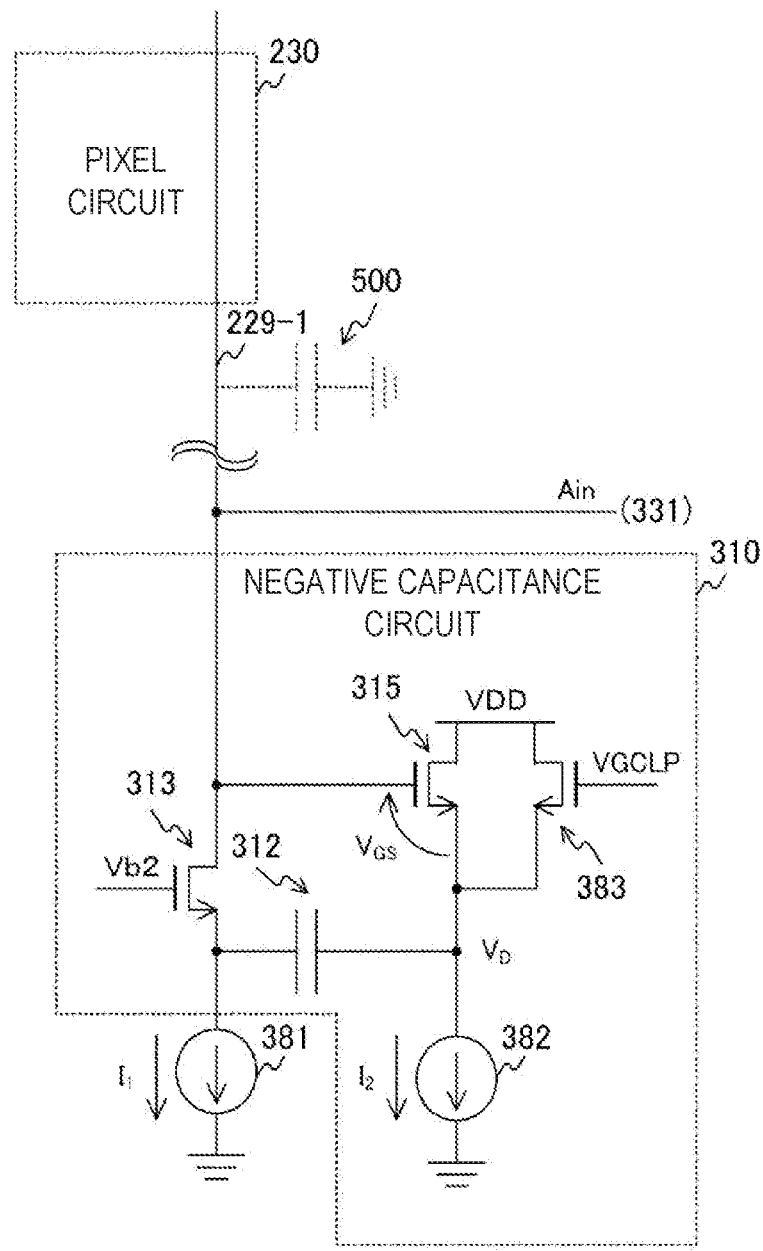
FIG. 27 is a circuit diagram illustrating one exemplary configuration of a negative capacitance circuit according to the eighth embodiment of the present technology.

FIG. 27 is a circuit diagram illustrating one exemplary configuration of a negative capacitance circuit 310 according to the eighth embodiment of the present technology. The negative capacitance circuit 310 for each column according to the eighth embodiment differs from the second embodiment by being additionally provided with a clamp transistor 383. In the diagram, the n-type transistor 321 of FIG. 7 operates as a current source 381, and the n-type transistor 316 operates as a current source 382. Let $I_1$ be the current supplied by the current source 381 and let $I_2$ be the current supplied by the current source 382. Also, let $V_{GS}$ be the gate-source voltage of the n-type transistor 315, and let $V_D$ be the drain voltage of the current source 382 (n-type transistor 316). Note that the current source 381 is one example of a first current source described in the claims, and the current source 382 is one example of a second current source described in the claims.

The clamp transistor 383 is connected in parallel with the n-type transistor 315 between a power source and the current source 382. An n-type MOS transistor is used as the clamp transistor 383, for example. A fixed gate voltage VGCLP is applied to the gate of the clamp transistor 383. Note that the same gate voltage VGCLP is supplied to all columns.

Figure 28:
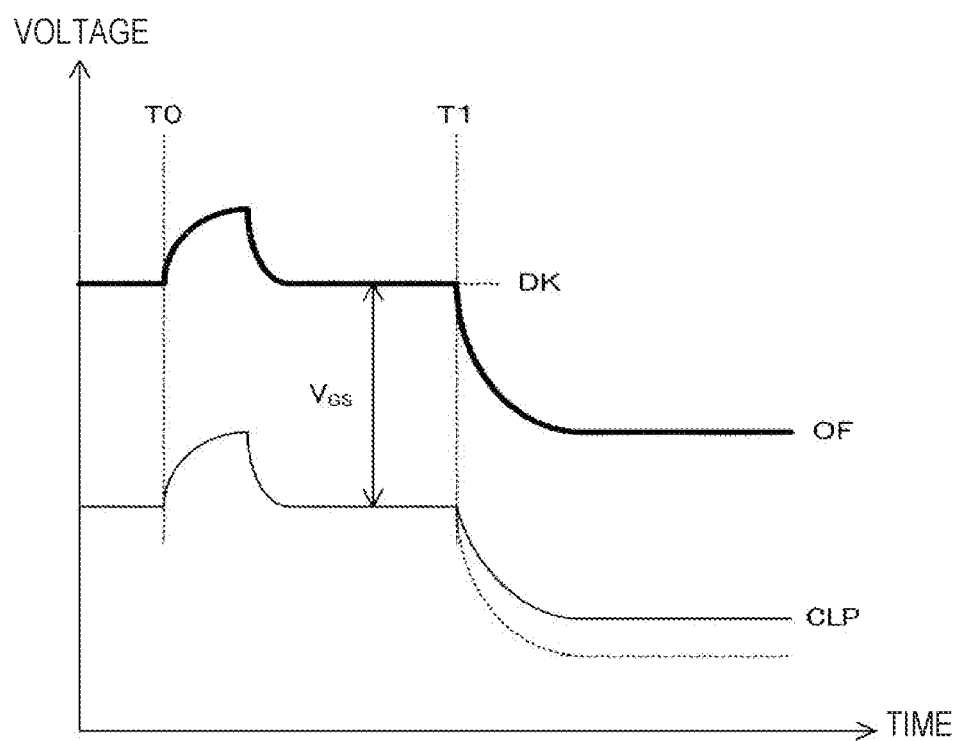
FIG. 28 is a graph illustrating one example of voltage variations in a vertical signal line and a drain voltage according to the eighth embodiment of the present technology.

FIG. 28 is a graph illustrating one example of voltage variations in a vertical signal line 229-$n$ and a drain voltage $V_D$ according to the eighth embodiment of the present technology. The vertical axis in the diagram represents the voltage or the drain voltage $V_D$ of one of the vertical signal lines 229-$n$, while the horizontal axis in the diagram represents time. Also, the bold solid line in the diagram illustrates fluctuations in the voltage of the vertical signal line 229-$n$. The dotted line in the diagram illustrates fluctuations in the drain voltage $V_D$ in the second embodiment not provided with the clamp transistor 383. On the other hand, the thin solid line in the diagram illustrates fluctuations in the drain voltage $V_D$ in the eighth embodiment provided with the clamp transistor 383.

When the transfer signal TX is input into one of the pixel circuits 230 at a timing T0, the voltage of the vertical signal line 229-$n$ falls from DK to OF starting from a timing T1. DK is a voltage corresponding to the dark current, while OF is a voltage corresponding to the amount of incident light.

When the amount of incident light is extremely large, the drop from DK to OF is large. Even in this case, the current source 381 corresponding to the current $I_1$ is designed to operate in the saturation region. On the other hand, the drain voltage $V_D$ of the current source 382 (n-type transistor 316) corresponding to the current 12 is lower than the voltage of the vertical signal line 229-$n$ by the gate-source voltage $V_{GS}$. For this reason, in the second embodiment not provided with the clamp transistor 383, there is a risk that the drop in the drain voltage $V_D$ will cause the current source 382 to operate in the linear region rather than the saturation region. If the current source 382 operates in the linear region, the current $I_2$ decreases. The fluctuation in the current $I_2$ causes the ground current, that is, the total of the currents $I_1$ and $I_2$, to fluctuate, and the streaking characteristics worsen.

Accordingly, the clamp transistor 383 is added to the negative capacitance circuit 310 according to the eighth embodiment. With this configuration, if the voltage of one of the vertical signal lines 229-n drops below the gate voltage VGCLP, the current flowing through the clamp transistor 382 becomes dominant in the current $I_2$. As the voltage of the vertical signal line 229-n becomes lower, the ratio of the current flowing through the clamp transistor 382 becomes larger, and the drain voltage $V_D$ is clamped to a fixed voltage CLP corresponding to the gate voltage VGCLP.

Figure 29:
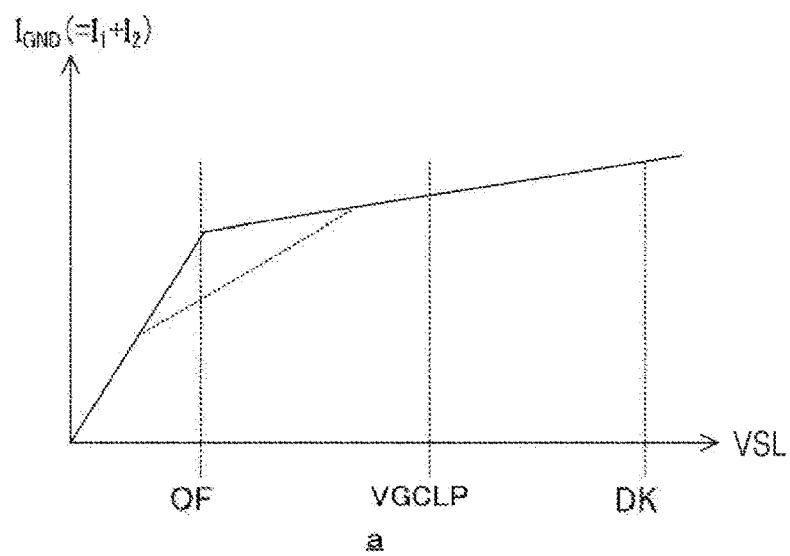
FIG. 29 illustrates graphs of one example of variations in a ground current and the amount of streaking according to the eighth embodiment of the present technology.
Figure 29:
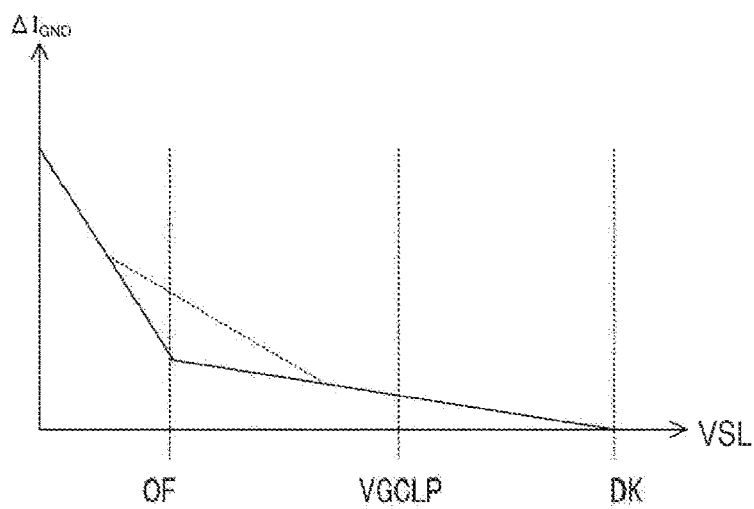
Figure 29:
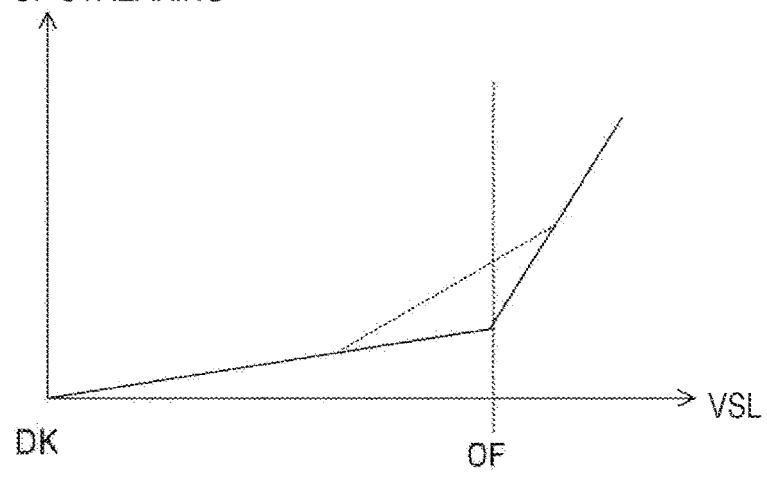

FIG. 29 illustrates graphs of one example of variations in a ground current and the amount of streaking according to the eighth embodiment of the present technology. In the diagram, a is a graph illustrating one example of fluctuations in the ground current $I_{GND}$, b is a graph illustrating one example of fluctuations in the difference $\Delta I_{GND}$ between the ground current and the dark current, and c is a graph illustrating one example of fluctuations in the amount of streaking. Also, the vertical axes in the diagram represent current or the amount of streaking, while the horizontal axes in the diagram represent the voltage VSL of one of the vertical signal lines 229-n. Also, in the diagram, the dotted lines illustrate fluctuations in the ground current and the amount of streaking in the second embodiment not provided with the clamp transistor 383. On the other hand, the solid lines illustrate fluctuations in the ground current and the amount of streaking in the eighth embodiment provided with the clamp transistor 383.

In the second embodiment not provided with the clamp transistor 383, as exemplified by the dotted lines, fluctuations in the current $I_2$ cause the ground current $I_{GND}$, that is, the total of the currents $I_1$ and $I_2$, to fluctuate, and the amount of streaking increases. On the other hand, in the eighth embodiment provided with the clamp transistor 383, as exemplified by the solid lines, a voltage margin necessary for the current source 382 to operate in the saturation region can be secured, and therefore fluctuations in the current $I_2$ can be suppressed. With this arrangement, fluctuations in the ground current $I_{GND}$, that is, the total of the currents $I_1$ and $I_2$, can be suppressed, and the amount of streaking can be reduced.

In this way, according to the eighth embodiment of the present technology, the drain voltage $V_D$ of the current source 382 is clamped by the clamp transistor 383, thereby improving the streaking characteristics.

9. Ninth Embodiment

In the eighth embodiment described above, the gate voltage VGCLP of the clamp transistor 383 is treated as a fixed value, but there is a risk that the proper value of the gate voltage VGCLP may be different from the expected value. The solid-state image sensor 200 according to the ninth embodiment differs from the eighth embodiment in that the gate voltage VGCLP is made variable to adjust the value thereof.

Figure 30:
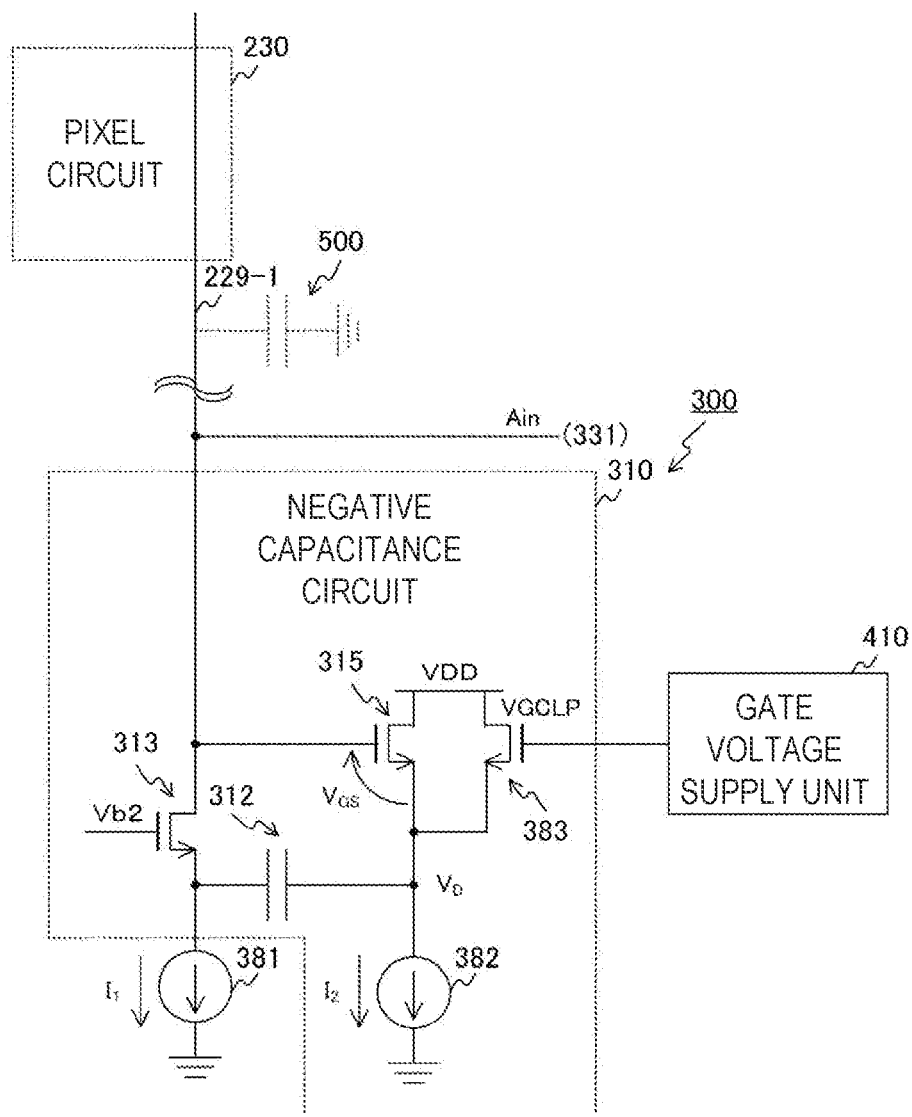
FIG. 30 is a circuit diagram illustrating one exemplary configuration of a column signal processing unit according to a ninth embodiment of the present technology.

FIG. 30 is a circuit diagram illustrating one exemplary configuration of a column signal processing unit 300 according to a ninth embodiment of the present technology. The column signal processing unit 300 in the ninth embodiment differs from the eighth embodiment by being additionally provided with a gate voltage supply unit 410.

The gate voltage supply unit 410 generates and supplies the gate voltage VGCLP to the each clamp transistor 383 on all columns.

Figure 31:
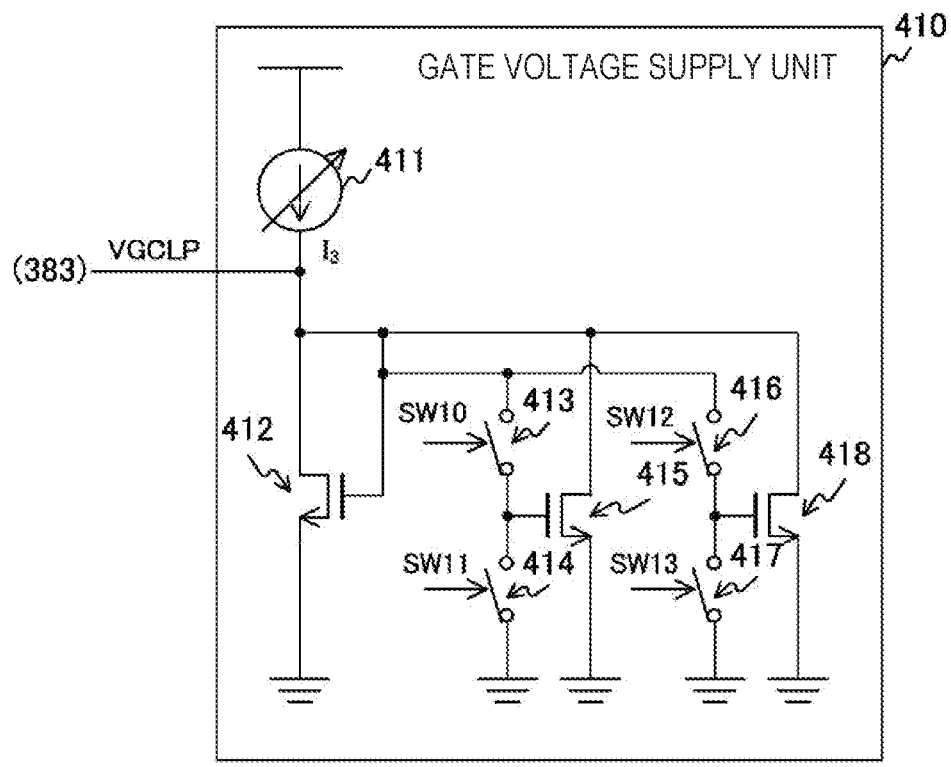
FIG. 31 is a circuit diagram illustrating one exemplary configuration of a gate voltage supply unit according to the ninth embodiment of the present technology.

FIG. 31 is a circuit diagram illustrating one exemplary configuration of a gate voltage supply unit 410 according to the ninth embodiment of the present technology. The gate voltage supply unit 410 is provided with a variable current source 411, n-type transistors 412, 415, and 418, and switches 413, 414, 416, and 417.

The variable current source 411 and the n-type transistor 412 are connected in series to a power source. The voltage of a junction of the variable current source 411 and the n-type transistor 412 is supplied to the gate of the clamp transistor 383 as the gate voltage VGCLP.

The n-type transistors 415 and 418 are connected in parallel to a junction of the variable current source 411 and the n-type transistor 412. The switches 413 and 414 are connected in series to a junction of the variable current source 411 and the n-type transistor 412, and a junction of switches 413 and 414 is connected to the gate of the n-type transistor 415. The switches 416 and 417 are connected in series to a junction of the variable current source 411 and the n-type transistor 412, and a junction of switches 416 and 417 is connected to the gate of the n-type transistor 418.

The value of the current supplied by the variable current source 411 is adjusted by a control signal held in a register or the like. Additionally, control signals SW10, SW11, SW12, and SW13 that cause the switches 413, 414, 416, and 417 to open and close are held in registers or the like.

In the configuration described above, a worker is able to adjust the value of the gate voltage VGCLP by changing the control signals in the registers. Note that the configuration of the gate voltage supply unit 410 is not limited to the circuit exemplified in the diagram, insofar as it is possible to change the gate voltage VGCLP.

Figure 32:
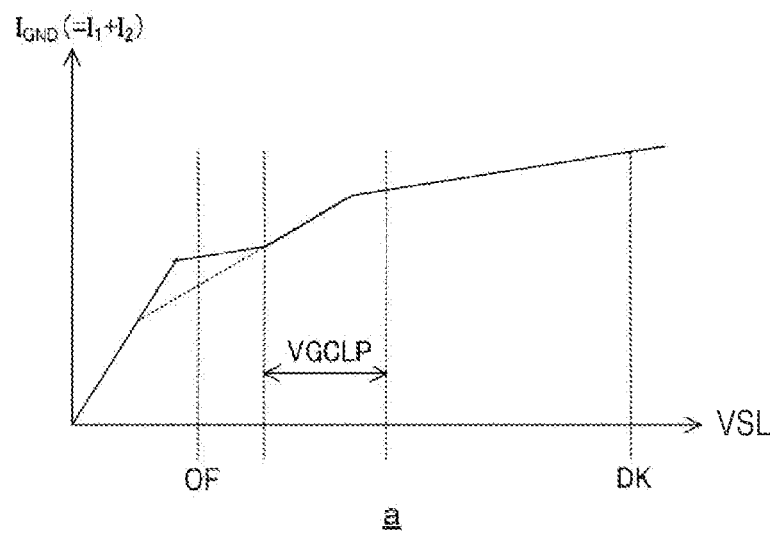
FIG. 32 illustrates graphs of one example of variations in a ground current and the amount of streaking according to the ninth embodiment of the present technology.
Figure 32:
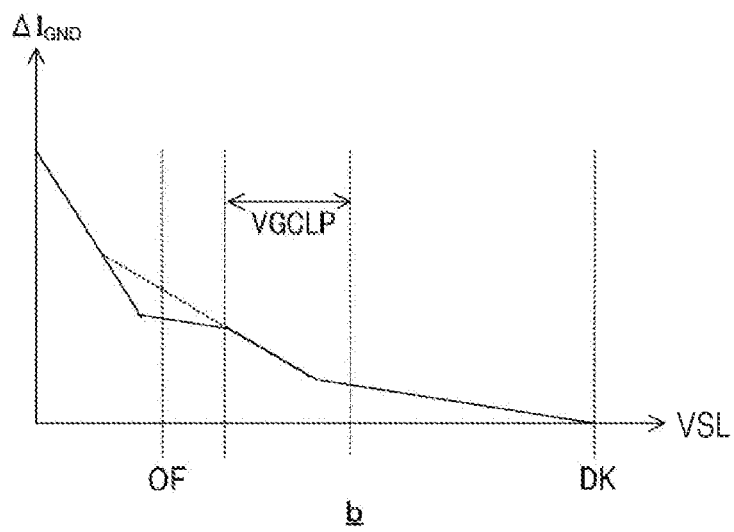
Figure 32:
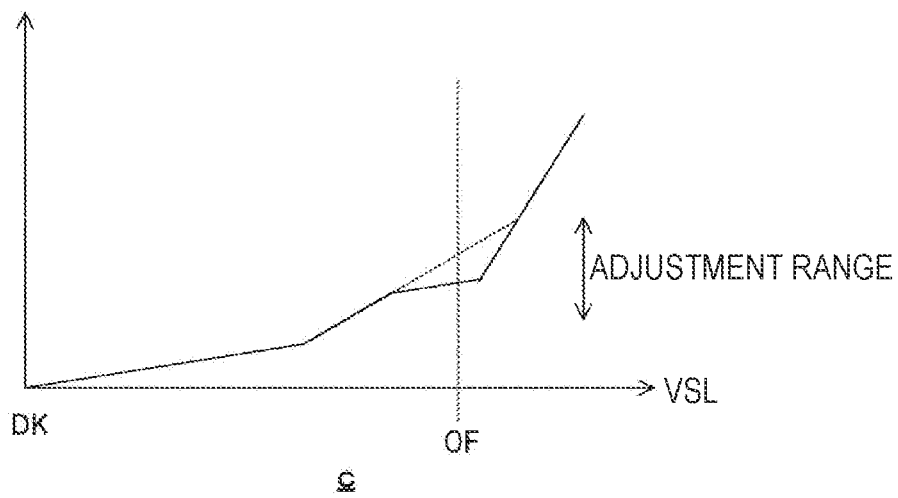

FIG. 32 illustrates graphs of one example of variations in a ground current and the amount of streaking according to the ninth embodiment of the present technology. In the diagram, a is a graph illustrating one example of fluctuations in the ground current $I_{GND}$, b is a graph illustrating one example of fluctuations in the difference $\Delta I_{GND}$ between the ground current and the dark current, and c is a graph illustrating one example of fluctuations in the amount of streaking. Also, the vertical axes in the diagram represent current or the amount of streaking, while the horizontal axes in the diagram represent the voltage VSL of one of the vertical signal lines 229-n. Also, in the diagram, the dotted lines illustrate fluctuations in the ground current and the amount of streaking in the second embodiment not provided with the clamp transistor 383. On the other hand, the solid lines illustrate fluctuations in the ground current and the amount of streaking in the ninth embodiment provided with the clamp transistor 383.

As exemplified in the diagram, the gate voltage supply unit 410 can adjust the amount of streaking by changing the gate voltage VGCLP.

In this way, according to the ninth embodiment of the present technology, the gate voltage supply unit 410 can change the gate voltage VGCLP and thereby adjust the amount of the streaking to a desired value.

10. Tenth Embodiment

In the first embodiment described above, a differential amplifier circuit that amplifies the difference between the analog signal Ain and the reference signal REF is used as the comparator 332 inside the ADC 331, but in this configuration, the power consumption of the solid-state image sensor 200 can be reduced further. The solid-state image sensor 200 according to the tenth embodiment differs from the first embodiment in that power consumption is reduced further.

Figure 33:
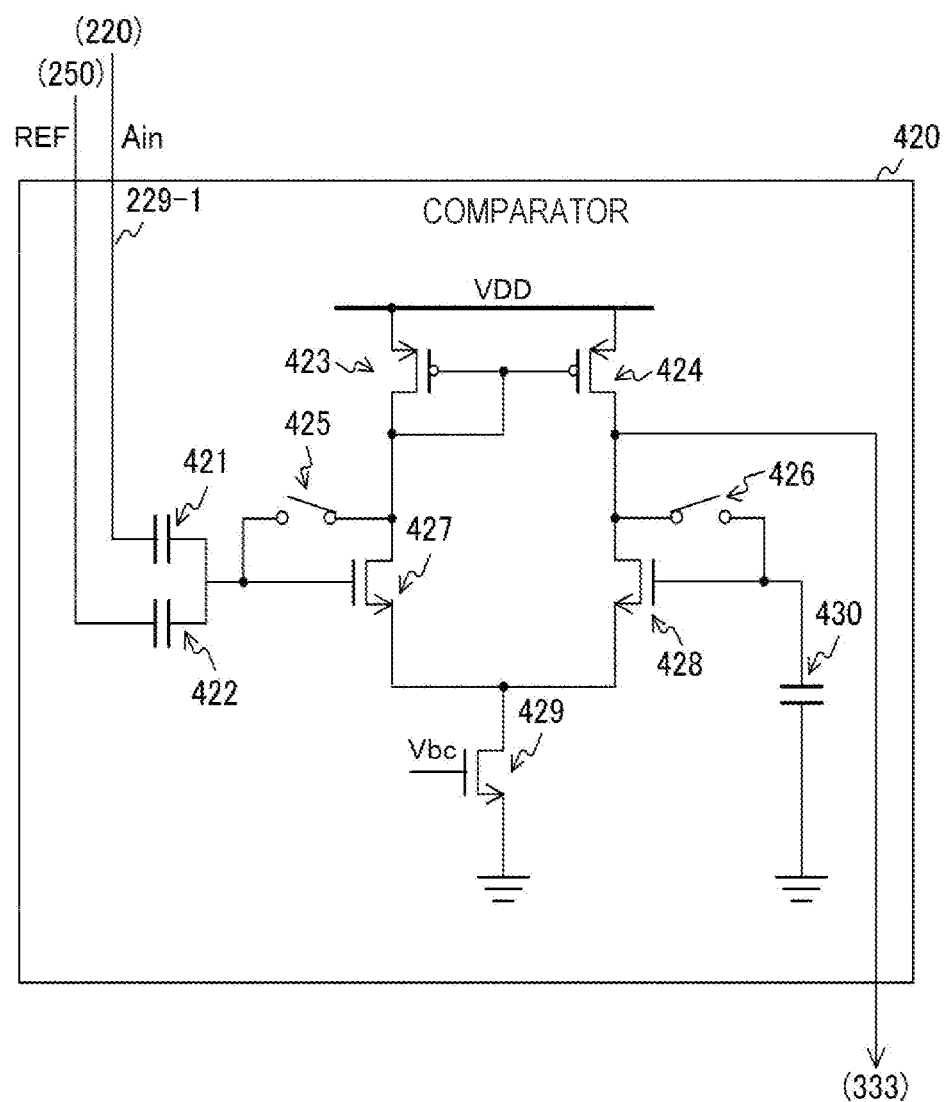
FIG. 33 is a circuit diagram illustrating one exemplary configuration of a comparator according to a tenth embodiment of the present technology.

FIG. 33 is a circuit diagram illustrating one exemplary configuration of a comparator 420 according to the tenth embodiment of the present technology. In the tenth embodiment, the comparator 420 is disposed instead of the comparator 331 in each column. The comparator 420 is provided with capacitors 421, 422, and 430, p-type transistors 423 and 424, switches 425 and 426, and n-type transistors 427 to 429. MOS transistors are used as the p-type transistor 423, the p-type transistor 424, the n-type transistor 427, the n-type transistor 428, and the n-type transistor 429, for example.

One terminal of each of the capacitors 421 and 422 is connected in common to the gate of the n-type transistor 427. Also, the analog signal Ain is input into the other terminal of the capacitor 421 via one of the vertical signal lines 229-$n$. The reference signal REF is input into the other terminal of the capacitor 422.

The p-type transistors 423 and 424 are connected in parallel to a power source. The gate of the p-type transistor 423 is connected to the drain and to the gate of the p-type transistor 424. The n-type transistor 427 is inserted between the n-type transistor 429 and the p-type transistor 423, while the n-type transistor 428 is inserted between the n-type transistor 429 and the p-type transistor 424. A predetermined bias voltage Vbc is applied to the gate of the n-type transistor 429. Also, the potential of a junction of the p-type transistor 424 and the n-type transistor 428 is supplied to the counter 333 as the comparison result signal of the comparator 420.

The switch 425 opens and closes the path between the gate and the drain of the n-type transistor 427. The switch 426 opens and closes the path between the gate and the drain of the n-type transistor 428. The capacitor 430 is inserted between the gate of the n-type transistor 428 and a ground terminal.

In the configuration described above, the capacitors 421 and 422 divide the voltage between the analog signal Ain and the reference signal REF by a division ratio based on the capacitance values of the capacitors. Also, the circuit containing the p-type transistors 423 and 424, the switches 425 and 426, and the n-type transistors 427 to 429 functions as a differential amplifier circuit. The differential amplifier circuit amplifies the difference between the input voltage from the capacitors 421 and 422, and a predetermined voltage from the capacitor 430. Note that the circuit containing the capacitors 421 and 422 is one example of a divider circuit described in the claims.

In this way, according to the tenth embodiment of the present technology, the voltage between the analog signal Ain and the reference signal REF is divided and input into the differential amplifier circuit, thereby making it possible to drive the comparator 420 with a lower voltage than in the first embodiment and reduce power consumption.

11. Example of Application to Mobile Object

The technology (present technology) according to an embodiment of the present disclosure is applicable to a variety of products. For example, the technology according to an embodiment of the present disclosure is implemented as devices mounted on any type of mobile objects such as automobiles, electric vehicles, hybrid electric vehicles, motorcycles, bicycles, personal mobilities, airplanes, drones, ships, and robots.

Figure 34:
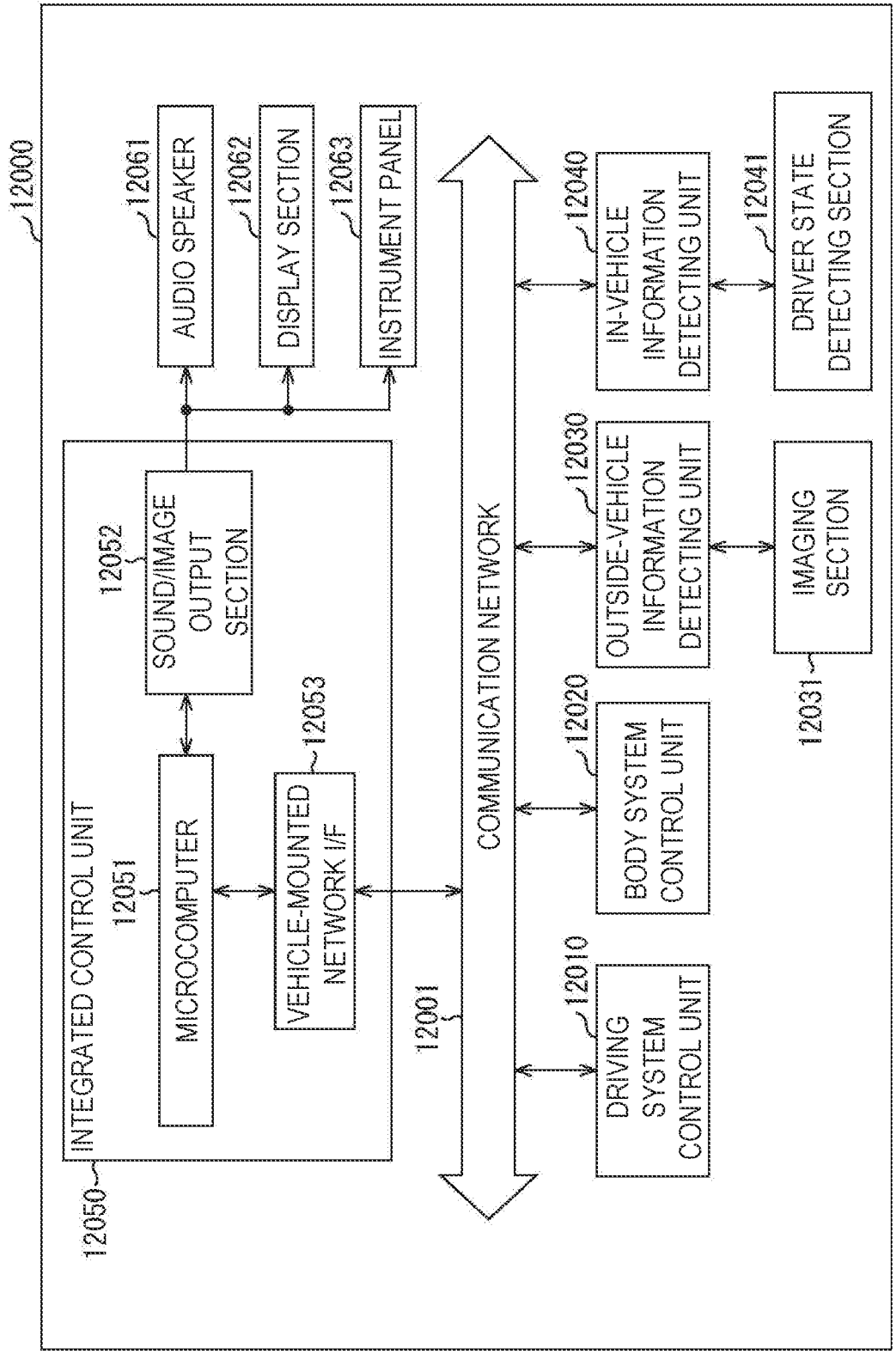
FIG. 34 is a block diagram depicting an example of schematic configuration of a vehicle control system.

FIG. 34 is a block diagram depicting an example of schematic configuration of a vehicle control system as an example of a mobile body control system to which the technology according to an embodiment of the present disclosure can be applied.

The vehicle control system 12000 includes a plurality of electronic control units connected to each other via a communication network 12001. In the example depicted in FIG. 34, the vehicle control system 12000 includes a driving system control unit 12010, a body system control unit 12020, an outside-vehicle information detecting unit 12030, an in-vehicle information detecting unit 12040, and an integrated control unit 12050. In addition, a microcomputer 12051, a sound/image output section 12052, and a vehicle-mounted network interface (I/F) 12053 are illustrated as a functional configuration of the integrated control unit 12050.

The driving system control unit 12010 controls the operation of devices related to the driving system of the vehicle in accordance with various kinds of programs. For example, the driving system control unit 12010 functions as a control device for a driving force generating device for generating the driving force of the vehicle, such as an internal combustion engine, a driving motor, or the like, a driving force transmitting mechanism for transmitting the driving force to wheels, a steering mechanism for adjusting the steering angle of the vehicle, a braking device for generating the braking force of the vehicle, and the like.

The body system control unit 12020 controls the operation of various kinds of devices provided to a vehicle body in accordance with various kinds of programs. For example, the body system control unit 12020 functions as a control device for a keyless entry system, a smart key system, a power window device, or various kinds of lamps such as a headlamp, a backup lamp, a brake lamp, a turn signal, a fog lamp, or the like. In this case, radio waves transmitted from a mobile device as an alternative to a key or signals of various kinds of switches can be input to the body system control unit 12020. The body system control unit 12020 receives these input radio waves or signals, and controls a door lock device, the power window device, the lamps, or the like of the vehicle.

The outside-vehicle information detecting unit 12030 detects information about the outside of the vehicle including the vehicle control system 12000. For example, the outside-vehicle information detecting unit 12030 is connected with an imaging section 12031. The outside-vehicle information detecting unit 12030 makes the imaging section 12031 image an image of the outside of the vehicle, and receives the imaged image. On the basis of the received image, the outside-vehicle information detecting unit 12030 may perform processing of detecting an object such as a human, a vehicle, an obstacle, a sign, a character on a road surface, or the like, or processing of detecting a distance thereto.

The imaging section 12031 is an optical sensor that receives light, and which outputs an electric signal corresponding to a received light amount of the light. The imaging section 12031 can output the electric signal as an image, or can output the electric signal as information about a measured distance. In addition, the light received by the imaging section 12031 may be visible light, or may be invisible light such as infrared rays or the like.

The in-vehicle information detecting unit 12040 detects information about the inside of the vehicle. The in-vehicle information detecting unit 12040 is, for example, connected with a driver state detecting section 12041 that detects the state of a driver. The driver state detecting section 12041, for example, includes a camera that images the driver. On the basis of detection information input from the driver state detecting section 12041, the in-vehicle information detecting unit 12040 may calculate a degree of fatigue of the driver or a degree of concentration of the driver, or may determine whether the driver is dozing.

The microcomputer 12051 can calculate a control target value for the driving force generating device, the steering mechanism, or the braking device on the basis of the information about the inside or outside of the vehicle which information is obtained by the outside-vehicle information detecting unit 12030 or the in-vehicle information detecting unit 12040, and output a control command to the driving system control unit 12010. For example, the microcomputer 12051 can perform cooperative control intended to implement functions of an advanced driver assistance system (ADAS) which functions include collision avoidance or shock mitigation for the vehicle, following driving based on a following distance, vehicle speed maintaining driving, a warning of collision of the vehicle, a warning of deviation of the vehicle from a lane, or the like.

In addition, the microcomputer 12051 can perform cooperative control intended for automatic driving, which makes the vehicle to travel autonomously without depending on the operation of the driver, or the like, by controlling the driving force generating device, the steering mechanism, the braking device, or the like on the basis of the information about the outside or inside of the vehicle which information is obtained by the outside-vehicle information detecting unit 12030 or the in-vehicle information detecting unit 12040.

In addition, the microcomputer 12051 can output a control command to the body system control unit 12020 on the basis of the information about the outside of the vehicle which information is obtained by the outside-vehicle information detecting unit 12030. For example, the microcomputer 12051 can perform cooperative control intended to prevent a glare by controlling the headlamp so as to change from a high beam to a low beam, for example, in accordance with the position of a preceding vehicle or an oncoming vehicle detected by the outside-vehicle information detecting unit 12030.

The sound/image output section 12052 transmits an output signal of at least one of a sound or an image to an output device capable of visually or auditorily notifying an occupant of the vehicle or the outside of the vehicle. In the example of FIG. 34, an audio speaker 12061, a display section 12062, and an instrument panel 12063 are illustrated as the output device. The display section 12062 may, for example, include at least one of an on-board display or a head-up display.

Figure 35:
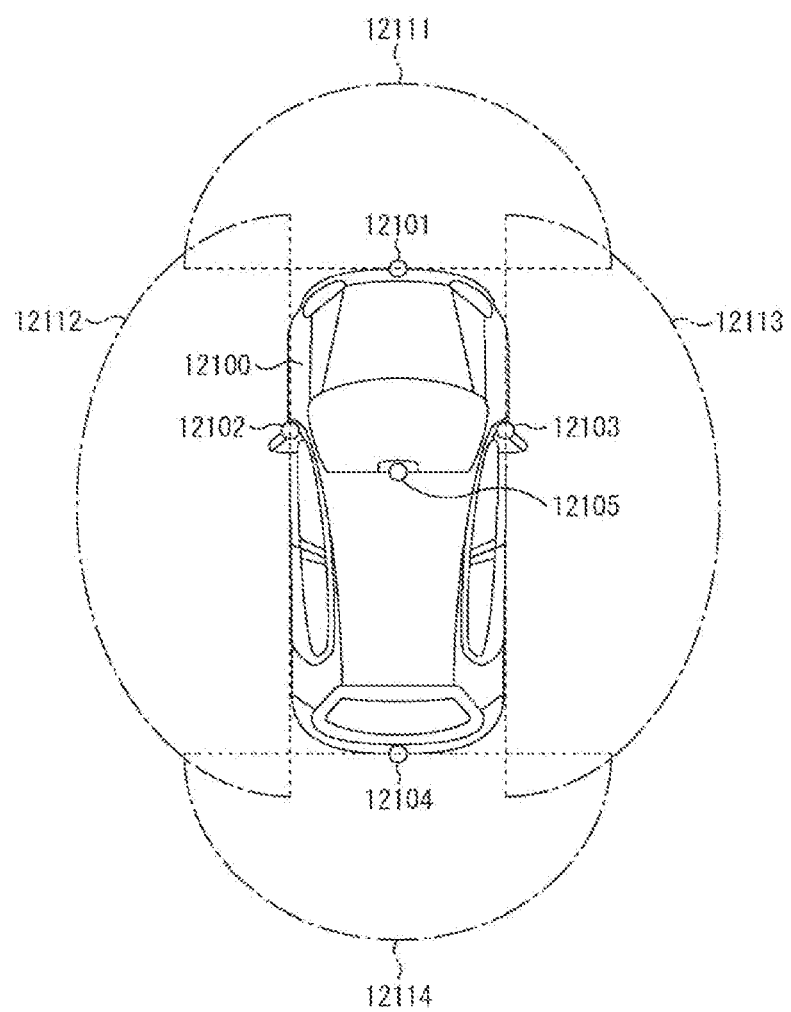
FIG. 35 is a diagram of assistance in explaining an example of installation positions of an imaging section.

FIG. 35 is a diagram depicting an example of the installation position of the imaging section 12031.

In FIG. 35, the imaging section 12031 includes imaging sections 12101, 12102, 12103, 12104, and 12105.

The imaging sections 12101, 12102, 12103, 12104, and 12105 are, for example, disposed at positions on a front nose, side view mirrors, a rear bumper, and a back door of the vehicle 12100 as well as a position on an upper portion of a windshield within the interior of the vehicle. The imaging section 12101 provided to the front nose and the imaging section 12105 provided to the upper portion of the windshield within the interior of the vehicle obtain mainly an image of the front of the vehicle 12100. The imaging sections 12102 and 12103 provided to the side view mirrors obtain mainly an image of the sides of the vehicle 12100. The imaging section 12104 provided to the rear bumper or the back door obtains mainly an image of the rear of the vehicle 12100. The imaging section 12105 provided to the upper portion of the windshield within the interior of the vehicle is used mainly to detect a preceding vehicle, a pedestrian, an obstacle, a signal, a traffic sign, a lane, or the like.

Incidentally, FIG. 35 depicts an example of imaging ranges of the imaging sections 12101 to 12104. An imaging range 12111 represents the imaging range of the imaging section 12101 provided to the front nose. Imaging ranges 12112 and 12113 respectively represent the imaging ranges of the imaging sections 12102 and 12103 provided to the side view mirrors. An imaging range 12114 represents the imaging range of the imaging section 12104 provided to the rear bumper or the back door. A bird's-eye image of the vehicle 12100 as viewed from above is obtained by superimposing image data imaged by the imaging sections 12101 to 12104, for example.

At least one of the imaging sections 12101 to 12104 may have a function of obtaining distance information. For example, at least one of the imaging sections 12101 to 12104 may be a stereo camera constituted of a plurality of imaging elements, or may be an imaging element having pixels for phase difference detection.

For example, the microcomputer 12051 can determine a distance to each three-dimensional object within the imaging ranges 12111 to 12114 and a temporal change in the distance (relative speed with respect to the vehicle 12100) on the basis of the distance information obtained from the imaging sections 12101 to 12104, and thereby extract, as a preceding vehicle, a nearest three-dimensional object in particular that is present on a traveling path of the vehicle 12100 and which travels in substantially the same direction as the vehicle 12100 at a predetermined speed (for example, equal to or more than 0 km/hour). Further, the microcomputer 12051 can set a following distance to be maintained in front of a preceding vehicle in advance, and perform automatic brake control (including following stop control), automatic acceleration control (including following start control), or the like. It is thus possible to perform cooperative control intended for automatic driving that makes the vehicle travel autonomously without depending on the operation of the driver or the like.

For example, the microcomputer 12051 can classify three-dimensional object data on three-dimensional objects into three-dimensional object data of a two-wheeled vehicle, a standard-sized vehicle, a large-sized vehicle, a pedestrian, a utility pole, etc., and other three-dimensional objects on the basis of the distance information obtained from the imaging sections 12101 to 12104, extract the classified three-dimensional object data, and use the extracted three-dimensional object data for automatic avoidance of an obstacle. For example, the microcomputer 12051 identifies obstacles around the vehicle 12100 as obstacles that the driver of the vehicle 12100 can recognize visually and obstacles that are difficult for the driver of the vehicle 12100 to recognize visually. Then, the microcomputer 12051 determines a collision risk indicating a risk of collision with each obstacle. In a situation in which the collision risk is equal to or higher than a set value and there is thus a possibility of collision, the microcomputer 12051 outputs a warning to the driver via the audio speaker 12061 or the display section 12062, and performs forced deceleration or avoidance steering via the driving system control unit 12010. The microcomputer 12051 can thereby assist in driving to avoid collision.

At least one of the imaging sections 12101 to 12104 may be an infrared camera that detects infrared rays. The microcomputer 12051 can, for example, recognize a pedestrian by determining whether or not there is a pedestrian in imaged images of the imaging sections 12101 to 12104. Such recognition of a pedestrian is, for example, performed by a procedure of extracting characteristic points in the imaged images of the imaging sections 12101 to 12104 as infrared cameras and a procedure of determining whether or not it is the pedestrian by performing pattern matching processing on a series of characteristic points representing the contour of the object. When the microcomputer 12051 determines that there is a pedestrian in the imaged images of the imaging sections 12101 to 12104, and thus recognizes the pedestrian, the sound/image output section 12052 controls the display section 12062 so that a square contour line for emphasis is displayed so as to be superimposed on the recognized pedestrian. Further, the sound/image output section 12052 may also control the display section 12062 so that an icon or the like representing the pedestrian is displayed at a desired position.

In the above, an example of the vehicle control system to which the technology related to the present technology can be applied is described. The technology related to the present disclosure can be applied, for example, to the imaging section 12031 in the configurations described above. Specifically, the imaging device 100 in FIG. 1 can be applied to the imaging section 12031. When the technology related to the present disclosure is applied to the imaging section 12031, it becomes possible to improve the read-put speed so as to enhance the frame rate.

Note that the above-described embodiments are examples for embodying the present technology, and matters in the embodiments each have a corresponding relationship with disclosure-specific matters in the claims. Likewise, the matters in the embodiments of the present technology and the disclosure-specific matters in the claims denoted by the same names have a corresponding relationship with each other. However, the present technology is not limited to the embodiments, and various modifications of the embodiments may be embodied in the scope of the present technology without departing from the spirit of the present technology.

Further, the processing sequences that are described in the embodiments described above may be handled as a method having a series of sequences or may be handled as a program for causing a computer to execute the series of sequences and recording medium storing the program. As the recording medium, a compact disc (CD), a MiniDisc (MD), a digital versatile disc (DVD), a memory card, a Blu-ray (registered trademark) Disc, or the like can be used.

Note that the effects described in the present specification are not necessarily limited, and any effect described in the present disclosure may be exhibited.

Additionally, the present technology may also be configured as below.

(1) A solid-state image sensor including:
a logic circuit configured to process an analog signal;
a pixel circuit configured to generate the analog signal by photoelectric conversion and output the analog signal to the logic circuit via a predetermined signal line; and
a negative capacitance circuit connected to the predetermined signal line.

(2) The solid-state image sensor according to (1), in which the negative capacitance circuit includes
an amplifier having an input terminal connected to the predetermined signal line, and
a capacitor having two terminals each connected to the input terminal and an output terminal of the amplifier.

(3) The solid-state image sensor according to (1), further including:
a current source connected to the predetermined signal line, in which
the negative capacitance circuit includes
an inserted transistor that is inserted between the current source and the predetermined signal line,
an amplifier including a pair of transistors connected in a cascode configuration between a power source and a reference terminal, and
a capacitor having one terminal connected to a junction of the pair of transistors and another terminal connected to a junction of the current source and the inserted transistor, and
a gate of the transistor connected to the power source from among the pair of transistors is connected to the predetermined signal line.

(4) The solid-state image sensor according to (3), in which a first bias voltage is applied to a gate of the inserted transistor, and
the current source includes a second transistor to which a second bias voltage different from the first bias voltage is applied.

(5) The solid-state image sensor according to (3), in which a first bias voltage is applied to a gate of the inserted transistor,
the current source includes a second transistor, and
a gate of the inserted transistor is connected to a gate of the second transistor.

(6) The solid-state image sensor according to (1), further including:
a current source connected to the predetermined signal line, in which
the negative capacitance circuit includes
an inserted transistor that is inserted between the current source and the predetermined signal line,
an amplifier having an input terminal connected to the predetermined signal line, and
a capacitor having one terminal connected to the input terminal of the amplifier and another terminal connected to a junction of the current source and the inserted transistor.

(7) The solid-state image sensor according to (1), further including:
a current source connected to the predetermined signal line, in which
the logic circuit includes
a comparator configured to compare the analog signal to a predetermined reference signal and output a comparison result, and
a control circuit configured to generate a control signal on the basis of the comparison result and output the generated control signal to the negative capacitance circuit.

(8) The solid-state image sensor according to (7), in which the negative capacitance circuit includes
an inserted transistor that is inserted between the current source and the predetermined signal line,
a capacitor,
an amplifier having an input terminal connected to the predetermined signal line,
a first switch configured to open and close a path between one terminal of the capacitor and an output terminal of the amplifier, and a second switch configured to connect another terminal of the capacitor to a junction of the inserted transistor and the current source or to a predetermined reference terminal, according to the control signal.

(9) The solid-state image sensor according to (7), in which the negative capacitance circuit includes an inserted transistor that is inserted between the current source and the predetermined signal line, a capacitor, an amplifier having an input terminal connected to the predetermined signal line, and a first switch configured to open and close a path between a junction of the inserted transistor and the current source, and one terminal of the capacitor, and a second switch configured to connect another terminal of the capacitor to an output terminal of the amplifier or a predetermined reference terminal, according to the control signal.

(10) The solid-state image sensor according to any one of (7) to (9), in which the comparator includes a divider circuit configured to divide a voltage between the analog signal and the predetermined reference signal, and output the divided voltage as an input voltage, and a differential amplifier circuit configured to amplify a difference between the input voltage and a predetermined voltage.

(11) The solid-state image sensor according to (1), further including:

a current source connected to the predetermined signal line, in which the negative capacitance circuit includes an inserted transistor that is inserted between the current source and the predetermined signal line, an amplifier having an input terminal connected to the predetermined signal line, and a switched capacitor circuit, and the switched capacitor circuit includes a capacitor, a first input-side switch configured to open and close a path between an output terminal of the amplifier and one terminal of the capacitor, a second input-side switch configured to open and close a path between a junction of the inserted transistor and the current source, and another terminal of the capacitor, a first output-side switch configured to open and close a path between the terminal and the logic circuit, and a second output-side switch configured to open and close a path between the another terminal and a predetermined reference terminal.

(12) The solid-state image sensor according to any one of (1) to (11), in which the pixel circuit is disposed on a first semiconductor chip, and the negative capacitance circuit and the logic circuit are disposed on a second semiconductor chip laminated on the first semiconductor chip.

(13) The solid-state image sensor according to any one of (1) to (12), further including:

a first current source connected to the predetermined signal line, in which the negative capacitance circuit includes an inserted transistor that is inserted between the first current source and the predetermined signal line, a second current source, an n-type transistor that is inserted between the second current source and a power source and has a gate connected to the predetermined signal line, a clamp transistor connected in parallel with the n-type transistor between the power source and the second current source, and a capacitor having two terminals each connected to a junction of the inserted transistor and the first current source, and a junction of the n-type transistor and the second current source.

(14) The solid-state image sensor according to (13), further including:

a gate voltage supply unit configured to change a gate voltage of the clamp transistor.

(15) An imaging device including:

a logic circuit configured to process an analog signal and output a digital signal;

a pixel circuit configured to generate the analog signal by photoelectric conversion and output the analog signal to the logic circuit via a predetermined signal line;

a negative capacitance circuit connected to the predetermined signal line; and a recording unit configured to record the digital signal.

REFERENCE SIGNS LIST

100 Imaging device
110 Imaging lens
120 Recording unit
130 Imaging control unit
200 Solid-state image sensor
201 Pixel chip
202 Logic chip
210 Vertical driver
220 Pixel array unit
230 Pixel circuit
231 Photodiode
232 Transfer transistor
233 Reset transistor
234 Floating diffusion
235 Amplifying transistor
236 Select transistor
240 Timing control unit
250, 371 DAC
260 Horizontal transfer scanning circuit
270 Image signal processing unit
300 Column signal processing unit
301 Upper column signal processing unit
302 Lower column signal processing unit
310 Negative capacitance circuit
311, 314, 351 Amp
312, 342, 356, 357, 372, 421, 422, 430 Capacitor
313, 315, 316, 321, 321-1, 321-2, 412, 415, 418, 427, 428, 429 N-type transistor
320, 381, 382 Current source
331, 370 ADC
332, 374, 420 Comparator
333 Counter
334, 341, 343, 352 to 355, 358 to 361, 373, 413, 414, 416, 417, 425, 426 Switch
335 Memory
350 Sample-and-hold circuit
375 Successive approximation control unit
383 Clamp transistor
410 Gate voltage supply unit
411 Variable current source
423, 424 P-type transistor
12031 Imaging unit

The invention claimed is:

1. A light detecting device comprising:
a pixel circuit configured to generate an analog signal by photoelectric conversion and output the analog signal to a comparator via a vertical signal line;
a first current source coupled to the vertical signal line; and
first circuitry coupled to the vertical signal line and the comparator, the first circuitry including:
a first transistor coupled between the first current source and the vertical signal line,
an amplifier including an input terminal coupled to the vertical signal line, and
a capacitor including a first terminal coupled to the input terminal of the amplifier and a second terminal coupled to an output terminal of the amplifier.

2. The light detecting device according to claim 1, wherein
the amplifier includes a pair of transistors coupled in a cascode configuration between a power source and a reference terminal,
the second terminal of the capacitor is coupled to a junction of the pair of transistors and the first terminal of the capacitor is coupled to a junction of the first current source and the first transistor, and
a gate of the transistor that is coupled to the power source from among the pair of transistors is coupled to the vertical signal line.

3. The light detecting device according to claim 2, wherein
a first bias voltage is applied to a gate of the first transistor, and
the first current source includes a second transistor to which a second bias voltage different from the first bias voltage is applied.

4. The light detecting device according to claim 2, wherein
a first bias voltage is applied to a gate of the first transistor,
the first current source includes a second transistor, and
a gate of the first transistor is coupled to a gate of the second transistor.

5. The light detecting device according to claim 1, wherein
the first terminal of the capacitor is coupled to a junction of the first current source and the first transistor.

6. The light detecting device according to claim 1, wherein
the comparator is configured to compare the analog signal to a reference signal and output a comparison result, and
further comprising a control circuit configured to generate a control signal on a basis of the comparison result and output the generated control signal to the first circuitry.

7. The light detecting device according to claim 1, wherein
the first circuitry includes
a first switch configured to open and close a path between the first terminal of the capacitor and the output terminal of the amplifier, and
a second switch configured to connect the second terminal of the capacitor to a junction of the first transistor and the first current source or to a predetermined reference terminal.

8. The light detecting device according to claim 1, wherein
the first circuitry includes
a first switch configured to open and close a path between a junction of the first transistor and the first current source, and the first terminal of the capacitor, and
a second switch configured to connect the second terminal of the capacitor to the output terminal of the amplifier or a predetermined reference terminal.

9. The light detecting device according to claim 1, wherein
the comparator includes
a first capacitor configured to receive the analog signal;
a second capacitor configured to receive a reference signal;
a differential amplifier circuit including one transistor coupled to the first and second capacitors and another transistor configured to receive a predetermined voltage.

10. The light detecting device according to claim 1, further comprising:
a switched capacitor circuit, the switched capacitor circuit including
a first input-side switch configured to open and close a path between an output terminal of another amplifier and a first terminal of another capacitor,
a second input-side switch configured to open and close a path between a junction of the first transistor and the first current source, and
a second terminal of the another capacitor, a first output-side switch configured to open and close a path between the first terminal and a logic circuit, and
a second output-side switch configured to open and close a path between the second terminal and a predetermined reference terminal.

11. The light detecting device according to claim 1, wherein
the pixel circuit is disposed on a first semiconductor chip, and
the first circuitry and the comparator are disposed on a second semiconductor chip laminated on the first semiconductor chip.

12. The light detecting device according to claim 1, wherein
the first circuitry includes
a second current source,
an n-type transistor that is inserted between the second current source and a power source and has a gate coupled to the vertical signal line,
a clamp transistor coupled in parallel with the n-type transistor between the power source and the second current source, and
the capacitor is coupled to a junction of the first transistor and the first current source, and a junction of the n-type transistor and the second current source.

13. The light detecting device according to claim 12, further comprising:
a gate voltage supply unit configured to change a gate voltage of the clamp transistor.

14. A light detecting device comprising:
a pixel circuit coupled to a vertical signal line;
a current source coupled to the vertical signal line;
first circuitry including a first transistor coupled between the vertical signal line and the current source; and
a comparator configured to compare a pixel signal received via the vertical signal line to a reference signal, wherein
the first circuitry includes an amplifier having an input terminal coupled to the vertical signal line and a capacitor having a first terminal coupled to the input terminal of the amplifier and a second terminal coupled to an output terminal of the amplifier.

15. A light detecting device comprising:
a pixel circuit coupled to a vertical signal line;
a current source coupled to the vertical signal line;
first circuitry including a first transistor coupled between the vertical signal line and the current source; and
a comparator configured to compare a pixel signal received via the vertical signal line to a reference signal, wherein
the pixel circuit is disposed on a first semiconductor chip, and the first circuitry and the comparator are disposed on a second semiconductor chip laminated on the first semiconductor chip.

* * * * *